(12) United States Patent
Inoue et al.

(10) Patent No.: US 8,689,546 B2
(45) Date of Patent: Apr. 8, 2014

(54) EXHAUST PURIFICATION SYSTEM OF INTERNAL COMBUSTION ENGINE

(75) Inventors: Mikio Inoue, Susono (JP); Kohei Yoshida, Gotenba (JP); Yuki Bisaiji, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 129 days.

(21) Appl. No.: 13/510,156

(22) PCT Filed: Aug. 29, 2011

(86) PCT No.: PCT/JP2011/070086
§ 371 (c)(1),
(2), (4) Date: May 16, 2012

(87) PCT Pub. No.: WO2013/031028
PCT Pub. Date: Mar. 7, 2013

(65) Prior Publication Data
US 2013/0047588 A1  Feb. 28, 2013

(51) Int. Cl.
*F01N 3/00* (2006.01)

(52) U.S. Cl.
USPC ............................................. 60/297; 60/301

(58) Field of Classification Search
USPC ................................................. 60/297, 301
See application file for complete search history.

(56) References Cited

U.S. PATENT DOCUMENTS

| | | | | |
|---|---|---|---|---|
| 7,213,395 B2 * | 5/2007 | Hu et al. | ........................... | 60/286 |
| 7,332,135 B2 * | 2/2008 | Gandhi et al. | ................ | 422/177 |
| 7,650,746 B2 * | 1/2010 | Hu et al. | ........................... | 60/286 |
| 2007/0016357 A1 * | 1/2007 | Nakagawa et al. | ............ | 701/104 |
| 2007/0271908 A1 * | 11/2007 | Hemingway et al. | ............ | 60/286 |
| 2009/0191108 A1 * | 7/2009 | Blanchard et al. | .......... | 423/239.1 |
| 2010/0236224 A1 * | 9/2010 | Kumar et al. | .................... | 60/297 |
| 2010/0242459 A1 * | 9/2010 | Tsujimoto et al. | ............... | 60/320 |

FOREIGN PATENT DOCUMENTS

| | | |
|---|---|---|
| JP | A-2003-97256 | 4/2003 |
| JP | A-2005-113801 | 4/2005 |
| JP | A-2008-2451 | 1/2008 |
| JP | A-2009-168031 | 7/2009 |
| JP | A-2009-257209 | 11/2009 |

* cited by examiner

*Primary Examiner* — Thomas Denion
*Assistant Examiner* — Jason Shanske
(74) *Attorney, Agent, or Firm* — Oliff PLC

(57) ABSTRACT

An exhaust purification system of an internal combustion engine is provided with an exhaust purification catalyst which removes $NO_x$ and a post treatment device. The exhaust purification catalyst has the property of reducing $NO_x$ if making the concentration of hydrocarbons vibrate by within a predetermined range of amplitude and within a predetermined range of period and furthermore has the function of oxidizing hydrocarbons. The exhaust purification system feeds hydrocarbons to the exhaust purification catalyst and raises the temperature of the post treatment device as temperature elevation control. The exhaust purification catalyst has a high purification rate range where the $NO_x$ purification rate becomes higher than a predetermined rate. In the temperature elevation control, the total feed amount of hydrocarbons is set and the feed period of hydrocarbons is set in the high purification rate range in a region at the end at the short side of feed period of hydrocarbons.

7 Claims, 23 Drawing Sheets

EXHAUST PURIFICATION SYSTEM OF INTERNAL COMBUSTION ENGINE

TECHNICAL FIELD

The present invention relates to an exhaust purification system of an internal combustion engine.

BACKGROUND ART

The exhaust gas of diesel engines, gasoline engines, and other internal combustion engines includes, for example, carbon monoxide (CO), unburned fuel (HC), nitrogen oxides ($NO_x$), particulate matter (PM), and other constituents. The internal combustion engines are mounted with exhaust purification systems for removing these constituents. As the method for removing nitrogen oxides, it is known to arrange an $NO_x$ storage catalyst in the engine exhaust passage. Further, as the method for removing the particulate matter, it is known to arrange a particulate filter in the engine exhaust passage.

In Japanese Patent Publication (A) No. 2009-257209, an exhaust purification system of an internal combustion engine is arranged in which an $NO_x$ storage catalyst and PM filter are provided in an exhaust passage and in which, in an intermediate part between the $NO_x$ storage catalyst and PM filter, a second fuel addition valve for feeding fuel to the PM filter, a mixer, and an oxidation catalyst are arranged in that order. It is disclosed that, at the time of regeneration of the PM filter, fuel which is fed from the second fuel addition valve is oxidized at the oxidation catalyst whereby the temperature of the exhaust gas rises and, furthermore, the temperature of the PM filter also rises. Further, it is disclosed that when the processing for $NO_x$ reduction for the $NO_x$ storage catalyst and the processing for regeneration for the PM filter overlap in timing, before adding fuel from the second fuel addition valve, the temperature of the exhaust gas near the mixer is made to rise to a temperature where the fuel which is added from the second fuel addition valve reliably vaporizes at the mixer.

CITATIONS LIST

Patent Literature

PLT 1: Japanese Patent Publication (A) No. 2009-257209

SUMMARY OF INVENTION

Technical Problem

The $NO_x$ which is contained in exhaust gas can be removed by an $NO_x$ storage catalyst which repeatedly stores $NO_x$ and releases and reduces $NO_x$. In the prior art, it is possible to maintain the air-fuel ratio of the exhaust gas which flows into the $NO_x$ storage catalyst lean for a long period so as to make the $NO_x$ be absorbed inside the $NO_x$ absorbent in the form of nitrate ions and so as to remove the $NO_x$ from the exhaust gas. The $NO_x$ which was absorbed inside of the $NO_x$ absorbent is released from the inside of the absorbent by making the air-fuel ratio of the exhaust gas the stoichiometric air-fuel ratio or rich. The $NO_x$ which is released from inside of the absorbent is reduced to nitrogen by the hydrocarbons and other reducing agents which are contained in the exhaust gas. When maintaining the air-fuel ratio of the exhaust gas lean for a long period in this way, if removing the $NO_x$ by control making the air-fuel ratio of the exhaust gas rich, there was the problem that when the $NO_x$ storage catalyst became a high temperature, the $NO_x$ purification rate would fall.

Further, the particulate matter which is trapped by the particulate filter can be removed by making the temperature of the particulate filter rise. In this regeneration of the particulate filter, it is possible to raise the temperature of the particulate filter by feeding fuel or other hydrocarbons to a catalyst which is arranged at an upstream side of the particulate filter and which can oxidize the fuel or other hydrocarbons. In this regard, if the total feed amount of the fuel or the fuel feed interval for raising the temperature of the particulate filter is set, the feed amount of fuel per feed operation would become greater and fuel slip is liable to occur at the catalyst able to oxidize the fuel. That is, the fuel is liable to end up passing straight through the catalyst and, as a result, being released into the atmosphere.

The present invention has as its object to provide an exhaust purification system of an internal combustion engine which is provided with an exhaust purification catalyst which removes $NO_x$ and a post treatment device which raises the temperature when reaching a predetermined state and which can give a high $NO_x$ purification rate even when the exhaust purification catalyst becomes a high temperature and furthermore keeps hydrocarbons from passing straight through when raising the temperature of a post treatment device.

Solution to Problem

The exhaust purification system of an internal combustion engine of the present invention in which inside an engine exhaust passage, an exhaust purification catalyst for causing a reaction between $NO_x$ which is contained in exhaust gas and modified hydrocarbons is arranged, precious metal catalysts are carried on an exhaust gas flow surface of the exhaust purification catalyst, a basic exhaust gas flow surface part is formed around the precious metal catalysts, and the exhaust purification catalyst has the property of reducing $NO_x$ which is contained in exhaust gas if making the concentration of hydrocarbons which flow into the exhaust purification catalyst vibrate by within a predetermined range of amplitude and within a predetermined range of period and has the property of a storage amount of $NO_x$ which is contained in the exhaust gas increasing if making the vibration period of the concentration of hydrocarbons longer than a predetermined range. The exhaust purification system is provided with a post treatment device which is arranged in the engine exhaust passage downstream from the exhaust purification catalyst and which raises the temperature when reaching a predetermined state and is formed to use the heat of oxidation of hydrocarbons which is generated in the exhaust purification catalyst to raise the temperature of the exhaust gas and raise the temperature of the post treatment device as temperature elevation control. In the control for making the concentration of hydrocarbons which flow into the exhaust purification catalyst vibrate by within a predetermined range of amplitude and within a predetermined range of period, when feeding a predetermined total feed amount of hydrocarbons during a predetermined period, the exhaust purification catalyst has an ascending range where the $NO_x$ purification rate rises if making the feed period of hydrocarbons change to become longer and a high purification rate range where the $NO_x$ purification rate becomes higher than a predetermined rate. In the temperature elevation control, the total feed amount of hydrocarbons required for raising the temperature of the post treatment device is set, the feed period of hydrocarbons and the feed amount of hydrocarbons per feed are set in the high purification rate range in a region at the end at the short side of the feed period of hydrocarbons, and hydrocarbons are fed by the set feed period of hydrocarbons and feed amount of hydrocarbons per feed.

In the above invention, in the temperature elevation control, it is preferable to feed the hydrocarbons by a specific feed period with the shortest feed period of hydrocarbons in the high purification rate range and by a specific feed amount of the feed amount of hydrocarbons per feed which corresponds to that specific feed period.

In the above invention, in the temperature elevation control, it is preferable to detect the operating state of the internal combustion engine every predetermined interval and use the detected operating state of the internal combustion engine as the basis to set the feed period of hydrocarbons and the feed amount of hydrocarbons per feed and to change the feed period of hydrocarbons and the feed amount of hydrocarbons per feed.

In the above invention, the post treatment device may include a particulate filter, and the temperature elevation control may include control for raising the temperature so as to make the particulate matter which is deposited on the particulate filter oxidize.

In the above invention, by having the $NO_x$ which is contained in the exhaust gas and the modified hydrocarbons react inside the exhaust purification catalyst, a reducing intermediate which contains nitrogen and hydrocarbons is produced. The vibration period of the concentration of hydrocarbons may be a period required for continued production of the reducing intermediate.

In the above invention, the precious metal catalyst may be comprised of at least one of rhodium Rh and palladium Pd and of platinum Pt.

In the above invention, the exhaust purification catalyst may include a basic layer which is formed on the exhaust gas flow surface and which contains an alkali metal or alkali earth metal or rare earth or metal which can donate electrons to the $NO_x$. The surface of the basic layer may form a basic exhaust gas flow surface part.

Advantageous Effects of Invention

According to the present invention, it is possible to provide an exhaust purification system of an internal combustion engine which is provided with an exhaust purification catalyst which removes $NO_x$ and a post treatment device which is raised in temperature when reaching a predetermined state and which can give a high $NO_x$ purification rate even when the exhaust purification catalyst becomes a high temperature and furthermore keeps hydrocarbons from passing straight through when raising the temperature of the post treatment device.

DESCRIPTION OF EMBODIMENTS

Referring to FIG. 1 to FIG. 33, an exhaust purification system of an internal combustion engine in an embodiment will be explained. In the present embodiment, the explanation will be given with reference to the example of a compression ignition type internal combustion engine which is mounted in an automobile.

Figure 1:
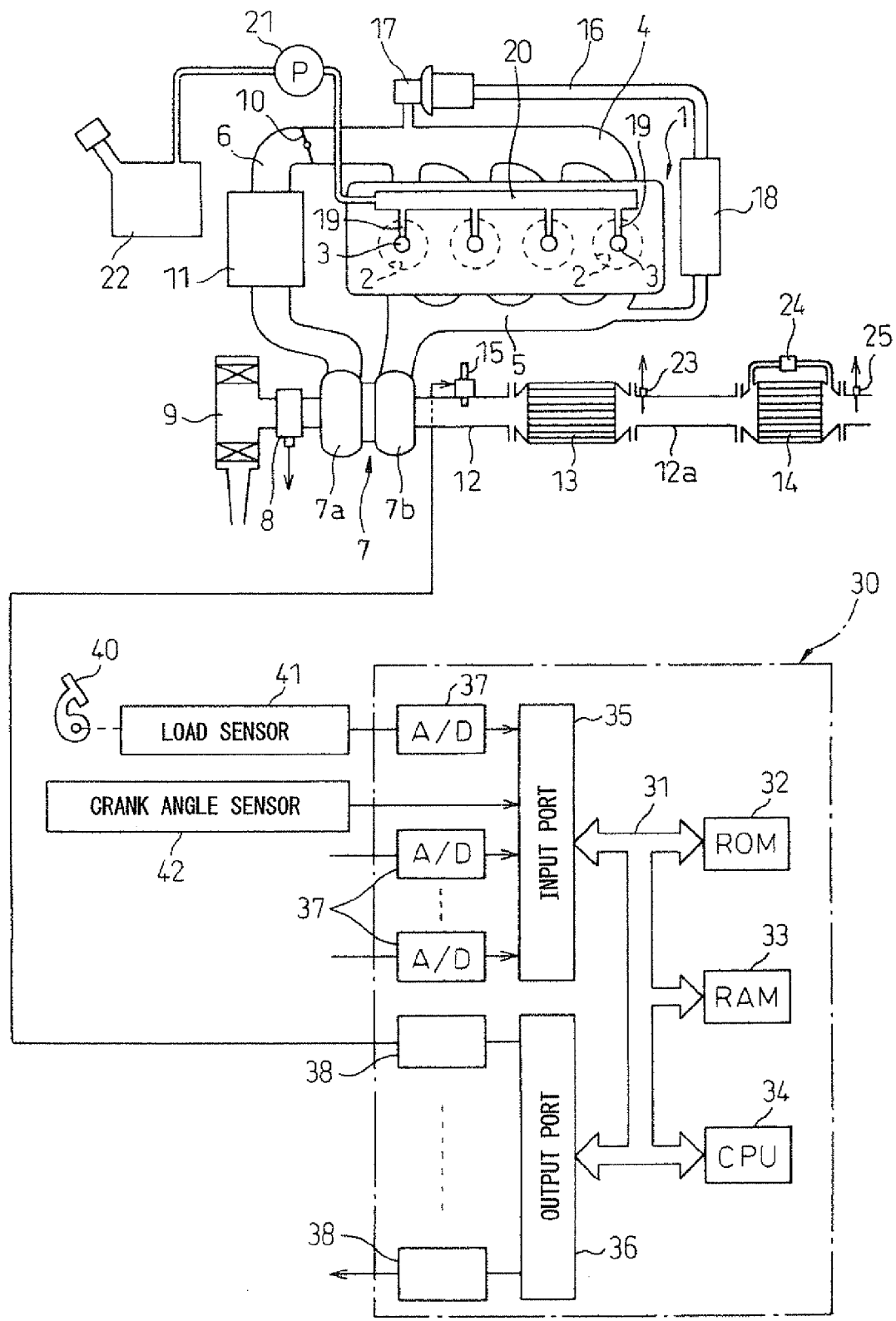
FIG. 1 is an overall view of a compression ignition type of internal combustion engine in an embodiment.

FIG. 1 is an overall view of an internal combustion engine in the present embodiment. The internal combustion engine is provided with an engine body 1. Further, the internal combustion engine is provided with an exhaust purification system which purifies exhaust gas. The engine body 1 includes cylinders comprised of combustion chambers 2, electronic control type fuel injectors 3 for injecting fuel to the respective combustion chambers 2, an intake manifold 4, and an exhaust manifold 5.

The intake manifold 4 is connected through an intake duct 6 to an outlet of a compressor 7a of an exhaust gas turbocharger 7. The inlet of the compressor 7a is connected through an intake air detector 8 to an air cleaner 9. Inside of the intake duct 6, a throttle valve 10 which is driven by a step motor is arranged. Furthermore, in the middle of the intake duct 6, a cooling device 11 is arranged for cooling the intake air which flows through the inside of the intake duct 6. In the embodiment which is shown in FIG. 1, engine cooling water is guided to the cooling device 11. The engine cooling water is used to cool the intake air.

On the other hand, the exhaust manifold 5 is connected to an inlet of a turbine 7b of an exhaust turbocharger 7. The outlet of the exhaust turbine 7b is connected through an exhaust pipe 12 to an inlet of an exhaust purification catalyst 13. An outlet of the exhaust purification catalyst 13 is connected through an exhaust pipe 12a to a particulate filter 14 which traps particulate which is contained in the exhaust gas.

Upstream of the exhaust purification catalyst 13, a hydrocarbon feed valve 15 is arranged for feeding hydrocarbons comprised of the diesel oil or other fuel which is used as fuel of a compression ignition type internal combustion engine. In the present embodiment, diesel oil is used as the hydrocarbons which are fed from the hydrocarbon feed valve 15. Note that, the present invention can also be applied to a spark ignition type of internal combustion engine in which the air-fuel ratio at the time of combustion is controlled to be lean. In this case, from the hydrocarbon feed valve, hydrocarbons comprised of the gasoline or other fuel which is used as fuel of a spark ignition type of internal combustion engine is fed.

Between the exhaust manifold 5 and the intake manifold 4, an EGR passage 16 is arranged for performing exhaust gas recirculation (EGR). Inside the EGR passage 16, an electronic control type EGR control valve 17 is arranged. Further, in the middle of the EGR passage 16, a cooling device 18 is arranged so as to cool the EGR gas which flows through the inside of the EGR passage 16. In the embodiment which is shown in FIG. 1, the engine cooling water is guided to the inside of the cooling device 18. The engine cooling water is used to cool the EGR gas.

Each fuel injector 3 is connected through a fuel feed pipe 19 to a common rail 20. The common rail 20 is connected through an electronic control type variable discharge fuel pump 21 to a fuel tank 22. The fuel which is stored in the fuel tank 22 is fed by the fuel pump 21 to the inside of the common rail 20. The fuel which is fed to the inside of the common rail 20 is fed through each fuel feed pipe 19 to each fuel injector 3.

The electronic control unit 30 is comprised of a digital computer. The electronic control unit 30 in the present embodiment functions as a control device of the exhaust purification system. The electronic control unit 30 includes components which are connected to each other by a bidirectional bus 31 such as a ROM (read only memory) 32, RAM (random access memory) 33, CPU (microprocessor) 34, input port 35, and output port 36. The ROM 32 stores in advance maps and other information required for control. The CPU 34 can perform any processing or judgment. The RAM 33 can store operational history and other information or store processing results.

Downstream of the exhaust purification catalyst 13, a temperature sensor 23 is mounted for detecting the temperature of the exhaust purification catalyst 13. Further, downstream of the particulate filter 14, a temperature sensor 25 is mounted for detecting the temperature of the particulate filter 14. The particulate filter 14 has attached to it a differential pressure sensor 24 for detecting the differential pressure before and after the particulate filter 14. The output signals of these temperature sensors 23 and 25, differential pressure sensor 24, and intake air detector 8 are input through the corresponding AD converters 37 to the input port 35.

Further, the accelerator pedal 40 has connected to it a load sensor 41 which generates an output voltage which is proportional to the amount of depression of the accelerator pedal 40. The output voltage of the load sensor 41 is input through a corresponding AD converter 37 to the input port 35. Furthermore, the input port 35 has connected to it a crank angle sensor 42 which generates an output pulse every time the crankshaft rotates by for example 15°. The output of the crank angle sensor 42 can be used to detect the crank angle or the engine speed. On the other hand, the output port 36 is connected through corresponding drive circuits 38 to the fuel injectors 3, step motor for driving the throttle valve 10, hydrocarbon feed valve 15, EGR control valve 17, and fuel pump 21. These fuel injectors 3, throttle valve 10, hydrocarbon feed valve 15, EGR control valve 17, etc. are controlled by the electronic control unit 30.

The particulate filter 14 is a filter which removes carbon particles, sulfates, and other particulate matter. The particulate filter 14, for example, has a honeycomb structure and has a plurality of channels which extend in a direction of flow of the gas. In the plurality of channels, channels with downstream ends which are sealed and channels with upstream ends which are sealed are alternately formed. The partition walls of the channels are formed by a porous material such as cordierite. The particulate matter is trapped when the exhaust gas passes through the partition walls. The particulate matter is trapped on the particulate filter 14. The particulate matter which gradually deposits on the particulate filter 14 is removed by oxidation by raising the temperature in an air-excess atmosphere until for example 650° C. or so.

Figure 2:
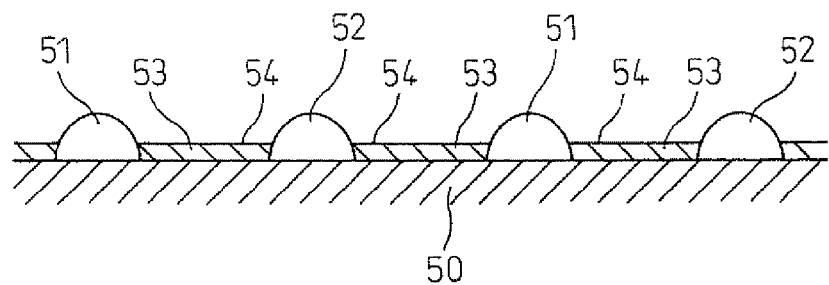
FIG. 2 is a view schematically showing a surface part of a catalyst carrier.

FIG. 2 is an enlarged view of a surface part of a catalyst carrier which is carried on a substrate of the exhaust purification catalyst in the present embodiment. The exhaust purification catalyst 13 is provided with a base member which includes passages through which the exhaust gas circulates. On the surfaces of the passages of the base member, a catalyst carrier 50 is arranged for carrying catalyst particles 51 and 52 serving as the precious metal catalyst. In the present embodiment, for example, there is provided a catalyst carrier 50 made of alumina on which precious metal catalyst particles 51 and 52 are carried. Furthermore, on the surface of the catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the "basic exhaust gas flow surface part 54".

On the other hand, in FIG. 2, the precious metal catalyst particles 51 are comprised of platinum Pt, while the precious metal catalyst particles 52 are comprised of rhodium Rh. That is, the precious metal catalyst particles 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalyst particles 51 and 52 which are carried on the catalyst carrier 50 are comprised of platinum Pt and at least one of rhodium Rh and palladium Pd.

Figure 3:
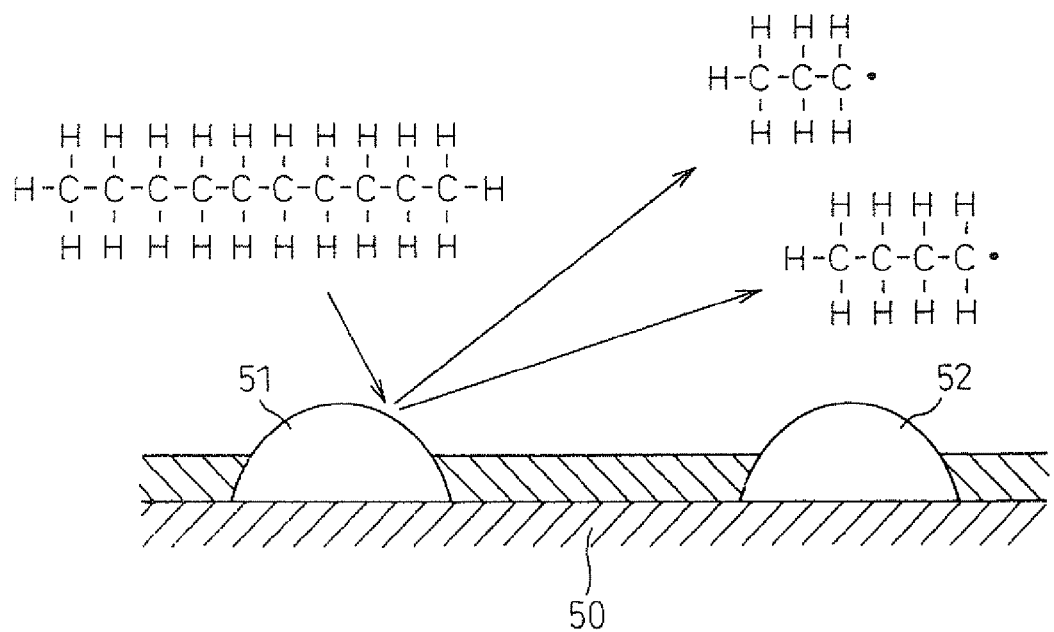
FIG. 3 is a view for explaining an oxidation reaction in an exhaust purification catalyst.

FIG. 3 schematically shows a modification action of hydrocarbons performed in the exhaust purification catalyst of the present embodiment. As shown in FIG. 3, the hydrocarbons HC which are injected from the hydrocarbon feed valve 15 become radical hydrocarbons HC with a small number of carbon atoms due to the catalytic action of the catalyst particles 51.

Figure 4:
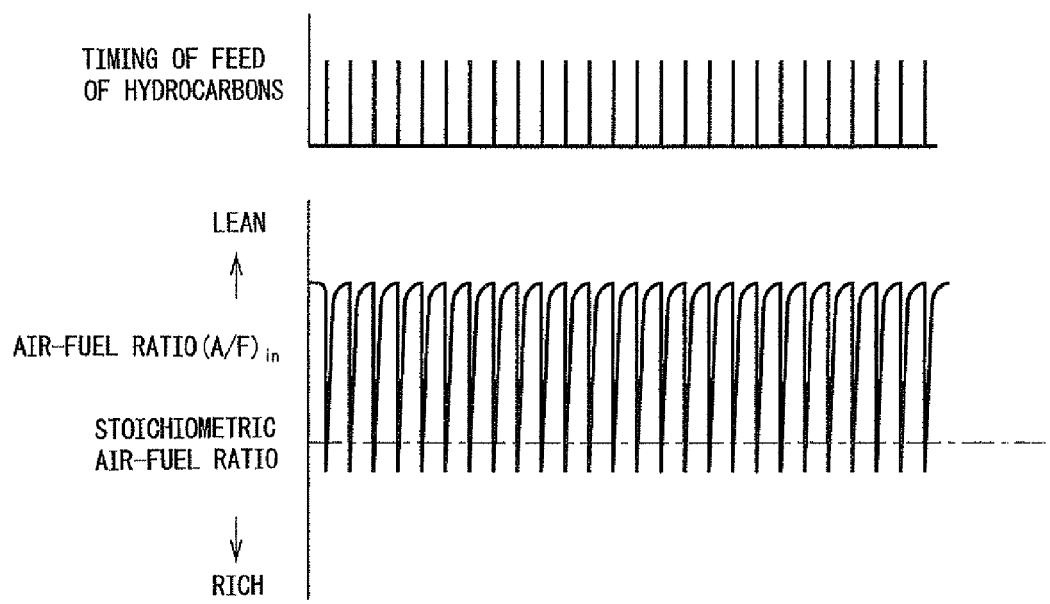
FIG. 4 is a view which shows a change of an air-fuel ratio of exhaust gas which flows into an exhaust purification catalyst in a first $NO_x$ purification method.

FIG. 4 shows a feed timing of hydrocarbons from the hydrocarbon feed valve and a change in the air-fuel ratio of the exhaust gas which flows into the exhaust purification catalyst. In the present invention, the ratio of the air and fuel (hydrocarbons) which are supplied into the engine intake passage, combustion chambers, and exhaust passage upstream of the exhaust purification catalyst is referred to as the air-fuel ratio (A/F) of the exhaust gas. The changes in the air-fuel ratio $(A/F)_{in}$ of the exhaust gas which flows into the exhaust purification catalyst depend on the change in concentration of the hydrocarbons in the exhaust gas which flows into the exhaust purification catalyst 13, so it can be said that the change in the air-fuel ratio $(A/F)_{in}$ shown in FIG. 4 expresses the change in concentration of the hydrocarbons. However, if the hydrocarbon concentration becomes higher, the air-fuel ratio $(A/F)_{in}$ becomes smaller, so, in FIG. 4, the more to the rich side the air-fuel ratio $(A/F)_{in}$ becomes, the higher the hydrocarbon concentration.

Figure 5:
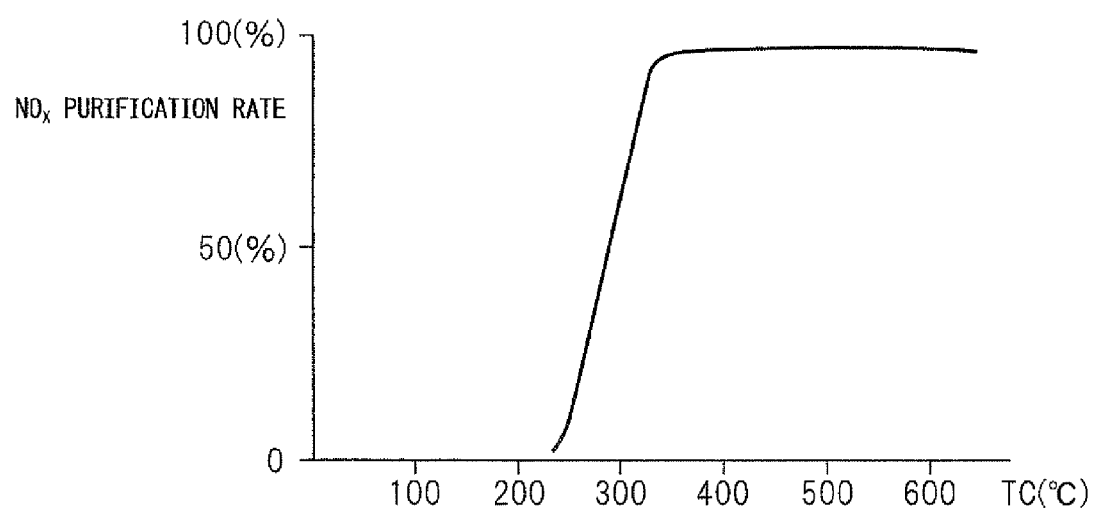
FIG. 5 is a view which shows an $NO_x$ purification rate of the first $NO_x$ purification method.

FIG. 5 is a graph which shows the relationship of the catalyst temperature of the exhaust purification catalyst and the $NO_x$ purification rate in the present embodiment. FIG. 5 shows the $NO_x$ purification rate with respect to the catalyst temperature TC of the exhaust purification catalyst 13 when periodically making the air-fuel ratio $(A/F)_{in}$ of the exhaust gas which flows into the exhaust purification catalyst 13 change as shown in FIG. 4. The inventors engaged in research relating to $NO_x$ purification for a long time. In the process of research, they learned that if making the concentration of hydrocarbons which flow into the exhaust purification catalyst 13 vibrate by within a predetermined range of amplitude and within a predetermined range of period, an extremely high $NO_x$ purification rate is obtained even in a 400° C. or higher high temperature region.

Furthermore, at this time, it is learned that a large amount of reducing intermediate containing nitrogen and hydrocarbons continues to be held on the surface of the basic layer 53, that is, on the basic exhaust gas flow surface part 54 of the exhaust purification catalyst 13. Furthermore, it is learned that this reducing intermediate plays a central role in obtaining a high $NO_x$ purification rate. Next, this will be explained with reference to FIGS. 6A and 6B.

Figure 6A:
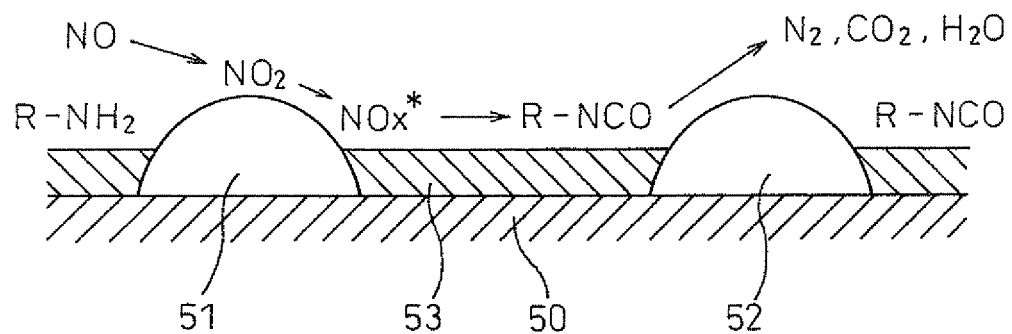
FIG. 6A and FIG. 6B are views for explaining an oxidation reduction reaction by an exhaust purification catalyst in the first $NO_x$ purification method.
Figure 6B:
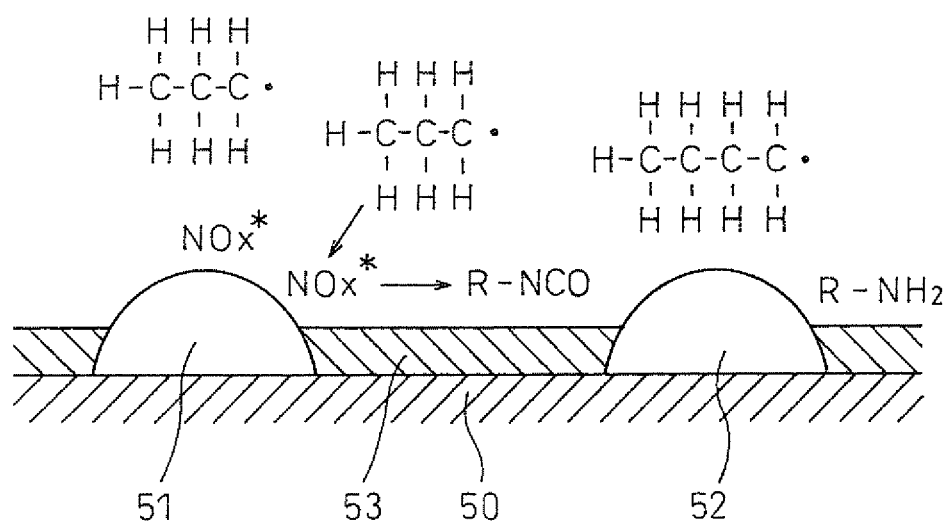

FIG. 6A and FIG. 6B schematically show a surface part of the catalyst carrier of the exhaust purification catalyst. FIG. 6A and FIG. 6B show the reaction which is presumed to occur when the concentration of hydrocarbons which flow into the exhaust purification catalyst is made to vibrate by within a predetermined range of amplitude and within a predetermined range of period. FIG. 6A shows the time when the concentration of hydrocarbons which flow into the exhaust purification catalyst 13 is low, while FIG. 6B shows the time when hydrocarbons are fed from the hydrocarbon feed valve 15 and the concentration of hydrocarbons which flow into the exhaust purification catalyst 13 becomes high.

Now, as will be understood from FIG. 4, the air-fuel ratio of the exhaust gas which flows into the exhaust purification catalyst 13 is maintained lean except for an instant. The exhaust gas which flows into the exhaust purification catalyst 13 normally becomes an oxygen-rich state. Therefore, the NO which is contained in the exhaust gas, as shown in FIG. 6A, is oxidized on the platinum catalyst particles 51 and becomes $NO_2$. Next, this $NO_2$ is further oxidized and becomes $NO_3$. Further, part of the $NO_2$ becomes $NO_2^-$. In this case, the amount of production of $NO_3$ is far greater than the amount of production of $NO_2^-$. Therefore, on the platinum catalyst particles 51, a large amount of $NO_3$ and a small amount of $NO_2^-$ are produced. These $NO_3$ and $NO_2^-$ are strong in activity. In the present invention, these $NO_3$ and $NO_2^-$ will be referred to as the "active $NO_x$" and shown by the symbol $NO_x^*$. The $NO_x$ is held on the surface of the basic layer 53 in the form of the active $NO_x$. That is, the $NO_x$ which is contained in the exhaust gas is held on the basic exhaust gas flow surface part 54.

On the other hand, if hydrocarbons are fed from the hydrocarbon feed valve 15, as shown in FIG. 3, the hydrocarbons are modified and become radicalized inside of the exhaust purification catalyst 13. As a result, as shown in FIG. 6B, the hydrogen concentration around the active $NO_x$ becomes higher. In this regard, if, after the active $NO_x$ is produced, the state of a high oxygen concentration around the active $NO_x$ continues for a constant time or more, the active $NO_x$ is oxidized and is absorbed in the form of nitrate ions $NO_3^-$ inside the basic layer 53. However, if, before this constant time elapses, the hydrocarbon concentration around the active $NO_x$ becomes higher, as shown in FIG. 6B, the active $NO_x$ reacts on the catalyst particles 51 with the radical hydrocarbons HC to thereby form the reducing intermediate. This reducing intermediate is held on the surface of the basic layer 53.

Note that, at this time, the first produced reducing intermediate is considered to be a nitro compound R—$NO_2$. If this nitro compound R—$NO_2$ is produced, the result becomes a nitrile compound R—CN. This nitrile compound R—CN can only survive for an instant in this state, so immediately becomes an isocyanate compound R—NCO. This isocyanate compound R—NCO, if hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, the concentration of hydrocarbons which flow into the exhaust purification catalyst 13 is lowered and thereby the oxygen concentration becomes higher. If this happens, the hydrocarbons around the reducing intermediate will be oxidized. As a result, as shown in FIG. 6A, the reducing intermediate and the active $NO_x$ react. At this time, the active $NO_x$ reacts with the reducing intermediate R—NCO or R—$NH_2$ to become $N_2$, $CO_2$, $H_2O$, therefore the $NO_x$ is removed.

In this way, in the exhaust purification catalyst 13, by making the concentration of hydrocarbons which flow into the exhaust purification catalyst 13 higher, a reducing intermediate is produced. The concentration of hydrocarbons which flow into the exhaust purification catalyst 13 is lowered and the oxygen concentration is raised so that the active $NO_x$ reacts with the reducing intermediate and the $NO_x$ is removed. That is, in order for the exhaust purification catalyst 13 to remove the $NO_x$, the concentration of hydrocarbons which flow into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_x$. That is, it is necessary to make the concentration of hydrocarbons which flow into the exhaust purification catalyst 13 vibrate by within a predetermined range of amplitude. Note that, in this case, it is necessary to hold a sufficient amount of reducing intermediate R—NCO or R—$NH_2$ on the basic layer 53, that is, the basic exhaust gas flow surface part 54, until the produced reducing intermediate reacts with the active $NO_x$. For this reason, the basic exhaust gas flow surface part 54 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_x$ is absorbed in the basic layer 53 in the form of nitrates without producing a reducing intermediate. To avoid this, it is necessary to make the concentration of hydrocarbons which flow into the exhaust purification catalyst 13 vibrate by within a predetermined range of period.

Therefore, in an embodiment of the present invention, to make the $NO_x$ which is contained in the exhaust gas and the modified hydrocarbons react and produce the reducing intermediate R—NCO or R—$NH_2$ containing nitrogen and hydrocarbons, the precious metal catalyst particles 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalyst 51 and 52. Due to the reducing action of the reducing intermediate R—NCO or R—$NH_2$ which is held on the basic exhaust gas flow surface part 54, the $NO_x$ is reduced. The vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
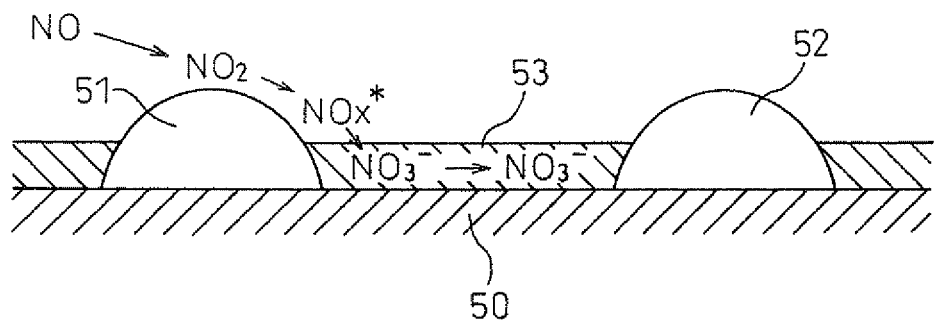
FIG. 7A and FIG. 7B are views for explaining an oxidation reduction reaction by an exhaust purification catalyst in a second $NO_x$ purification method.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_x$ which was produced on the catalyst particles 51, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
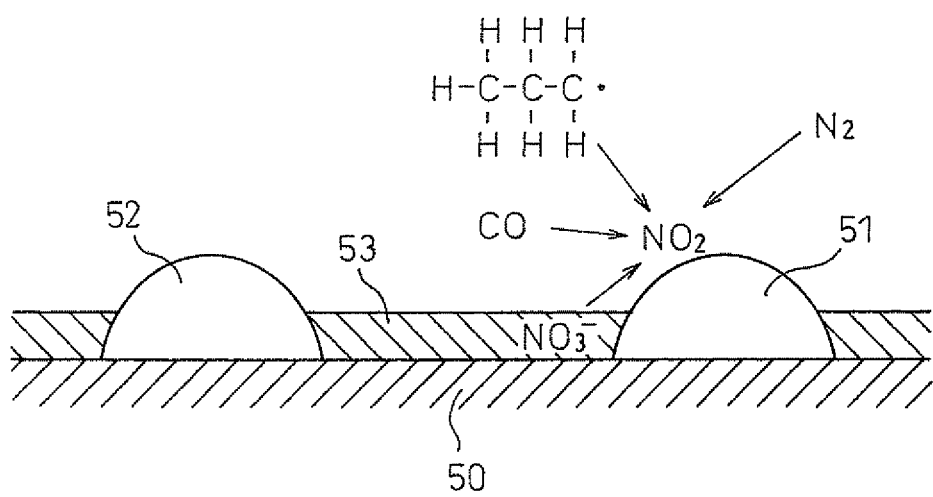

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 gradually become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

Figure 8:
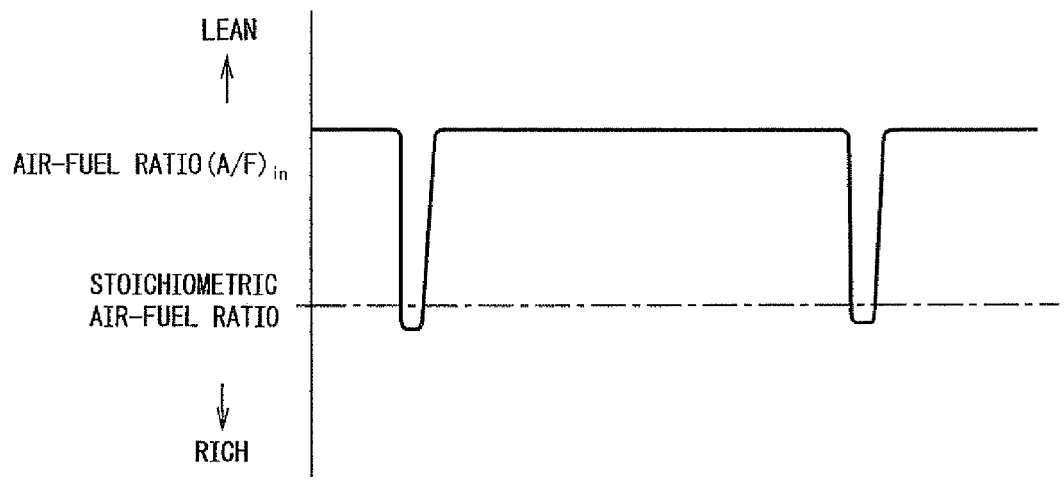
FIG. 8 is a view which shows a change of an air-fuel ratio of exhaust gas which flows into an exhaust purification catalyst in the second $NO_x$ purification method.

FIG. 8 shows the case of making the air-fuel ratio $(A/F)_{in}$ of the exhaust gas which flows into the exhaust purification catalyst temporarily rich slightly before the $NO_x$ absorption ability of the basic layer becomes saturated. Note that, in the example which is shown in FIG. 8, the time interval of this rich control is 1 minute or more. In this case, the $NO_x$ which was absorbed at the basic layer 53 when the air-fuel ratio $(A/F)_{in}$ of the exhaust gas was lean is released all at once and reduced from the basic layer 53 when the air-fuel ratio $(A/F)_{in}$ of the exhaust gas is made temporarily rich. Therefore, in this case, the basic layer 53 performs the role of an absorbent for temporarily absorbing the $NO_x$.

Note that, at this time, sometimes the basic layer 53 temporarily adsorbs $NO_x$. Therefore, if using the term "storage" as a term including both absorption and adsorption, at this time, the basic layer 53 performs the role of an $NO_x$ storage agent for temporarily storing $NO_x$. That is, in this case, the exhaust purification catalyst 13 functions as an $NO_x$ storage catalyst which stores $NO_x$ when the air-fuel ratio of the exhaust gas is lean and releases the stored $NO_x$ when the oxygen concentration in the exhaust gas falls.

Figure 9:
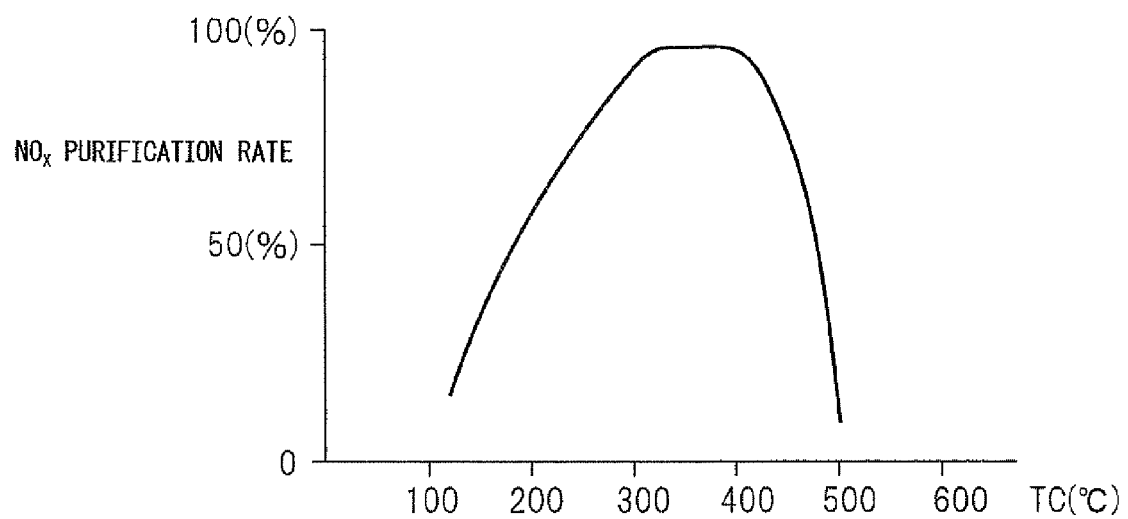
FIG. 9 is a view which shows an $NO_x$ purification rate of the second $NO_x$ purification method.

FIG. 9 shows the $NO_x$ purification rate when making the exhaust purification catalyst function as an $NO_x$ storage catalyst. Note that, the abscissa of FIG. 9 indicates the catalyst temperature TC of the exhaust purification catalyst 13. When making the exhaust purification catalyst 13 function as an $NO_x$ storage catalyst, an extremely high $NO_x$ purification rate is obtained when the catalyst temperature TC is 300° C. to 400° C., but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely small in amount, consequently, as shown in FIG. 5, even when the catalyst temperature TC is high, a high $NO_x$ purification rate is obtained.

Therefore, in the present invention, a hydrocarbon feed valve 15 for feeding hydrocarbons is arranged inside of an engine exhaust passage, an exhaust purification catalyst 13 for causing $NO_x$ which is contained in exhaust gas and modified hydrocarbons to react is arranged downstream of the hydrocarbon feed valve 15 in the engine exhaust passage, precious metal catalyst particles 51 and 52 are carried on the exhaust gas flow surface of the exhaust purification catalyst 13, a basic exhaust gas flow surface part 54 is formed around the precious metal catalyst particles 51 and 52, the exhaust purification catalyst 13 has the property of reducing the $NO_x$ which is contained in exhaust gas if the concentration of hydrocarbons which flow into the exhaust purification catalyst 13 is made to vibrate by within a predetermined range of amplitude and within a predetermined range of period and has the property of the storage amount of $NO_x$ which is contained in exhaust gas increasing if the vibration period of the hydrocarbon concentration is made longer than the predetermined range, and, at the time of engine operation, the concentration of hydrocarbons which flow into the exhaust purification catalyst 13 is made to vibrate by within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries precious metal catalyst particles and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the "first $NO_x$ purification method".

Next, referring to FIG. 10 to FIG. 15, this first $NO_x$ purification method will be explained in a bit more detail.

Figure 10:
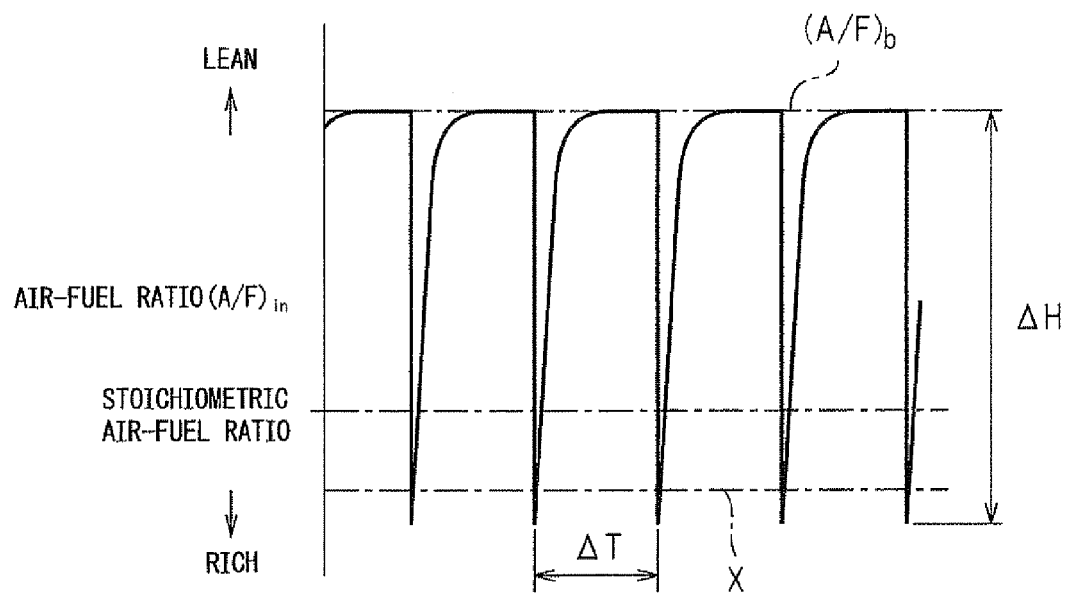
FIG. 10 is a time chart which shows a change of an air-fuel ratio of exhaust gas which flows into an exhaust purification catalyst in the first $NO_x$ purification method.

FIG. 10 shows enlarged the change in the air-fuel ratio $(A/F)_{in}$ shown in FIG. 4. Note that, as explained above, the change in the air-fuel ratio $(A/F)_{in}$ of the exhaust gas which flows into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, $(A/F)_b$ shows the base air-fuel ratio which shows the air-fuel ratio of the combustion gas for generating the engine output. In other words, this base air-fuel ratio $(A/F)_b$ shows the air-fuel ratio of the exhaust gas which flows into the exhaust purification catalyst 13 when stopping the feed of hydrocarbons. On the other hand, in FIG. 10, X shows the upper limit of the air-fuel ratio $(A/F)_{in}$ used for producing the reducing intermediate without the produced active $NO_x$ being stored in the form of nitrates inside the basic layer 53 much at all. To make the active $NO_x$ and the modified hydrocarbons react to produce a reducing intermediate, the air-fuel ratio $(A/F)_{in}$ has to be made lower than this upper limit X of the air-fuel ratio.

In other words, in FIG. 10, X shows the lower limit of the concentration of hydrocarbons required for making the active $NO_x$ and modified hydrocarbons react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_x$, that is, the air-fuel ratio $(A/F)_{in}$. The upper limit X of the air-fuel ratio which is required for producing the reducing intermediate will below be called the "requested minimum air-fuel ratio".

In the example shown in FIG. 10, the requested minimum air-fuel ratio X is rich, therefore, in this case, to form the reducing intermediate, the air-fuel ratio $(A/F)_{in}$ is instantaneously made the requested minimum air-fuel ratio X or less, that is, rich. As opposed to this, in the example shown in FIG. 11, the requested minimum air-fuel ratio X is lean. In this case, the air-fuel ratio $(A/F)_{in}$ is maintained lean while periodically reducing the air-fuel ratio $(A/F)_{in}$ so as to form the reducing intermediate.

In this case, whether the requested minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal catalyst particles 51 and becomes stronger in oxidizing strength if strengthening the acidity. Therefore, the oxidizing strength of the exhaust purification catalyst 13 changes due to the carried amount or the strength of the acidity of the precious metal 51.

Figure 11:
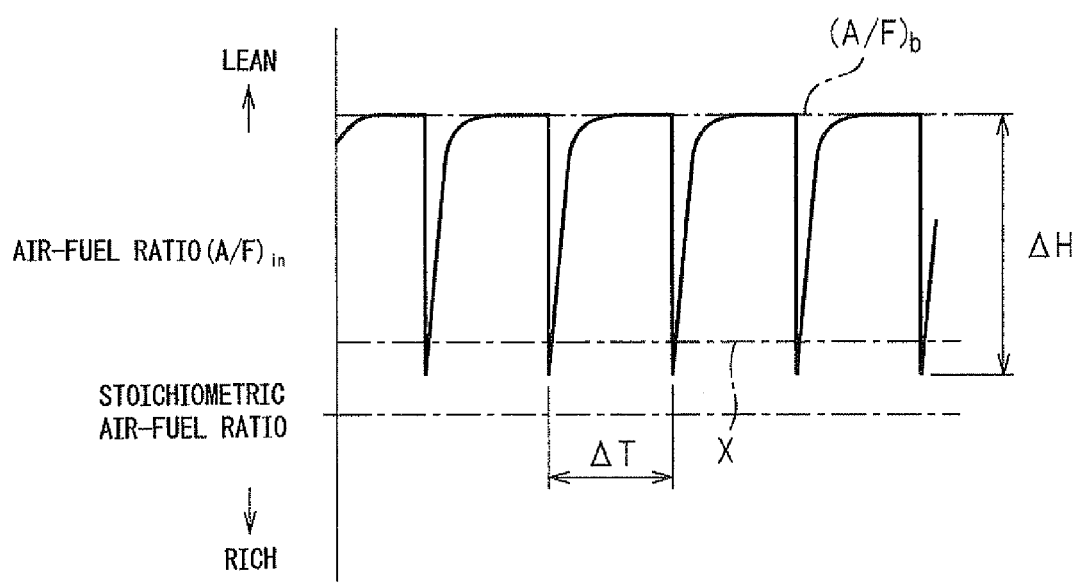
FIG. 11 is another time chart which shows a change of an air-fuel ratio of exhaust gas which flows into an exhaust purification catalyst in the first $NO_x$ purification method.

Now, if using an exhaust purification catalyst 13 with a strong oxidizing strength, as shown in FIG. 11, if maintaining the air-fuel ratio $(A/F)_{in}$ lean while periodically lowering the air-fuel ratio $(A/F)_{in}$, the hydrocarbons end up becoming completely oxidized when the air-fuel ratio $(A/F)_{in}$ is reduced. As a result, the reducing intermediate can no longer be produced. As opposed to this, when using an exhaust purification catalyst 13 with a strong oxidizing strength, as shown in FIG. 10, if making the air-fuel ratio $(A/F)_{in}$ periodically rich, when the air-fuel ratio $(A/F)_{in}$ is made rich, the hydrocarbons will not be completely oxidized, but will be partially oxidized, that is, the hydrocarbons will be modified, consequently the reducing intermediate will be produced. Therefore, when using an exhaust purification catalyst 13 with a strong oxidizing strength, the requested minimum air-fuel ratio X has to be made rich.

On the other hand, when using an exhaust purification catalyst 13 with a weak oxidizing strength, as shown in FIG. 11, if maintaining the air-fuel ratio $(A/F)_{in}$ lean while periodically lowering the air-fuel ratio $(A/F)_{in}$, the hydrocarbons will not be completely oxidized, but will be partially oxidized, that is, the hydrocarbons will be modified, and consequently the reducing intermediate will be produced. As opposed to this, when using an exhaust purification catalyst 13 with a weak oxidizing strength, as shown in FIG. 10, if making the air-fuel ratio $(A/F)_{in}$ periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the requested minimum air-fuel ratio X has to be made lean.

Figure 12:
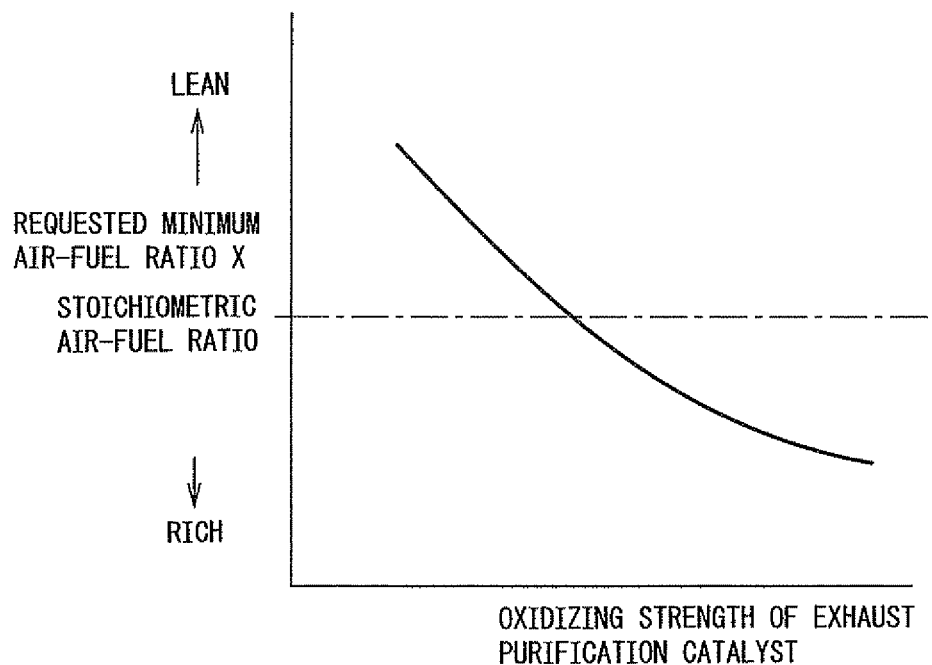
FIG. 12 is a view which shows the relationship between an oxidizing strength of an exhaust purification catalyst and a requested minimum air-fuel ratio X in the first $NO_x$ purification method.

That is, it is learned that the requested minimum air-fuel ratio X, as shown in FIG. 12, has to be reduced the stronger the oxidizing strength of the exhaust purification catalyst 13. In this way the requested minimum air-fuel ratio X becomes lean or rich due to the oxidizing strength of the exhaust purification catalyst 13. Below, taking as example the case where the requested minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio $(A/F)_b$ becomes larger, that is, if the oxygen concentration in the exhaust gas before the hydrocarbons are fed becomes higher, the feed amount of hydrocarbons required for making the air-fuel ratio $(A/F)_{in}$ the requested minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
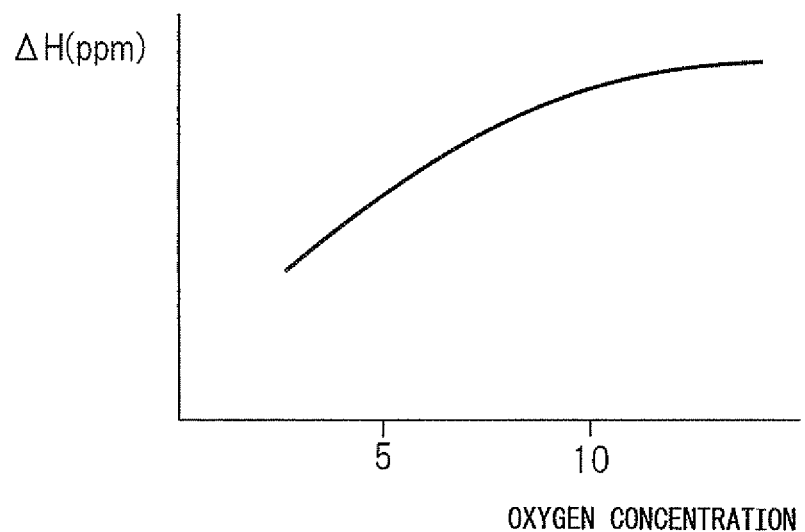
FIG. 13 is a view which shows the relationship between an oxygen concentration in exhaust gas and an amplitude $\Delta H$ of a hydrocarbon concentration giving the same $NO_x$ purification rate in the first $NO_x$ purification method.

FIG. 13 shows the relationship between the oxygen concentration in the exhaust gas before the hydrocarbons are fed and the amplitude $\Delta H$ of the hydrocarbon concentration when the same $NO_x$ purification rate is obtained. To obtain the same $NO_x$ purification rate from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_x$ purification rate, the higher the base air-fuel ratio $(A/F)_b$, the greater the amplitude $\Delta H$ of the hydrocarbon concentration has to be made. In other words, to remove the $NO_x$ well, the lower the base air-fuel ratio $(A/F)_b$, the more the amplitude $\Delta H$ of the hydrocarbon concentration can be reduced.

Figure 14:
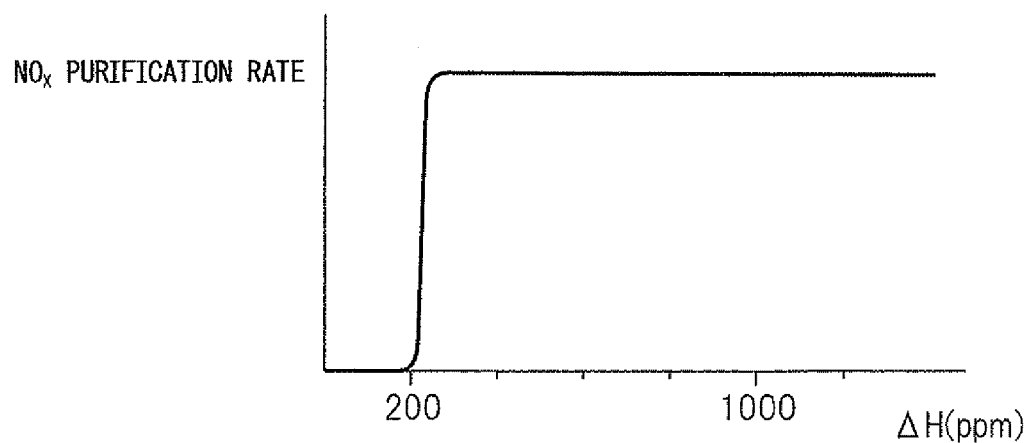
FIG. 14 is a view which shows a relationship between an amplitude $\Delta H$ of a hydrocarbon concentration and an $NO_x$ purification rate in the first $NO_x$ purification method.

In this regard, the base air-fuel ratio $(A/F)_b$ becomes the lowest at the time of an acceleration operation. At this time, if the amplitude $\Delta H$ of the hydrocarbon concentration is about 200 ppm, it is possible to remove the $NO_x$ well. The base air-fuel ratio $(A/F)_b$ is normally larger than the time of acceleration operation. Therefore, as shown in FIG. 14, if the amplitude $\Delta H$ of the hydrocarbon concentration is 200 ppm or more, an excellent $NO_x$ purification rate can be obtained.

On the other hand, it is learned that when the base air-fuel ratio $(A/F)_b$ is the highest, if making the amplitude $\Delta H$ of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
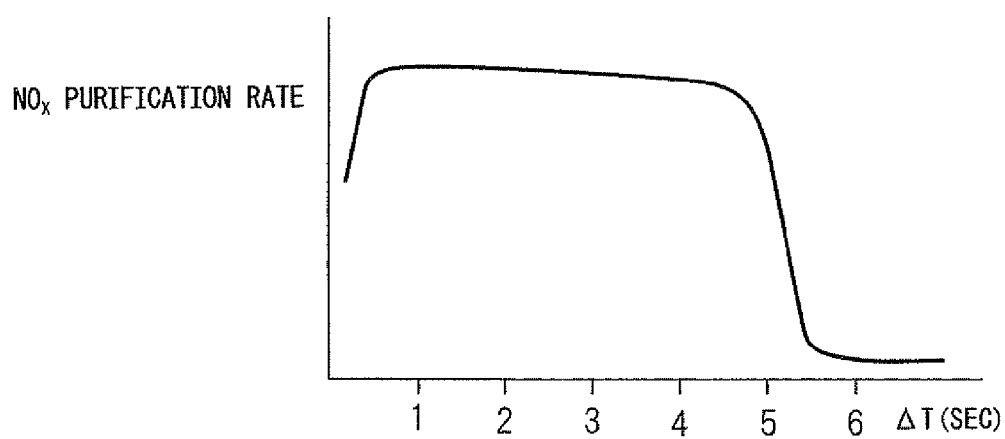
FIG. 15 is a view which shows a relationship between a vibration period $\Delta T$ of a hydrocarbon concentration and an $NO_x$ purification rate in the first $NO_x$ purification method.

Further, if the vibration period $\Delta T$ of the hydrocarbon concentration becomes longer, in the interval from when hydrocarbons are supplied to when hydrocarbons are next supplied, the concentration of oxygen around the active $NO_x$ will become higher. In this case, if the vibration period $\Delta T$ of the hydrocarbon concentration becomes longer than about 5 seconds, the active $NO_x$ will start to be absorbed in the form of nitrates inside the basic layer 53. Therefore, as shown in FIG. 15, if the vibration period $\Delta T$ of the hydrocarbon concentration becomes longer than 5 seconds or so, the $NO_x$ purification rate will fall. Therefore the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period $\Delta T$ of the hydrocarbon concentration becomes about 0.3 second or less, the $NO_x$ purification rate falls. Therefore, in the present invention, the vibration period of the hydrocarbon concentration is made from 0.3 second to 5 seconds.

Next, while referring to FIG. 16 to FIG. 19, the $NO_x$ purification method when making the exhaust purification catalyst function as an $NO_x$ storage catalyst will be specifically explained. In the present invention, the $NO_x$ purification method in the case of making the exhaust purification catalyst 13 function as an $NO_x$ storage catalyst will be referred to as "the second $NO_x$ purification method".

Figure 16:
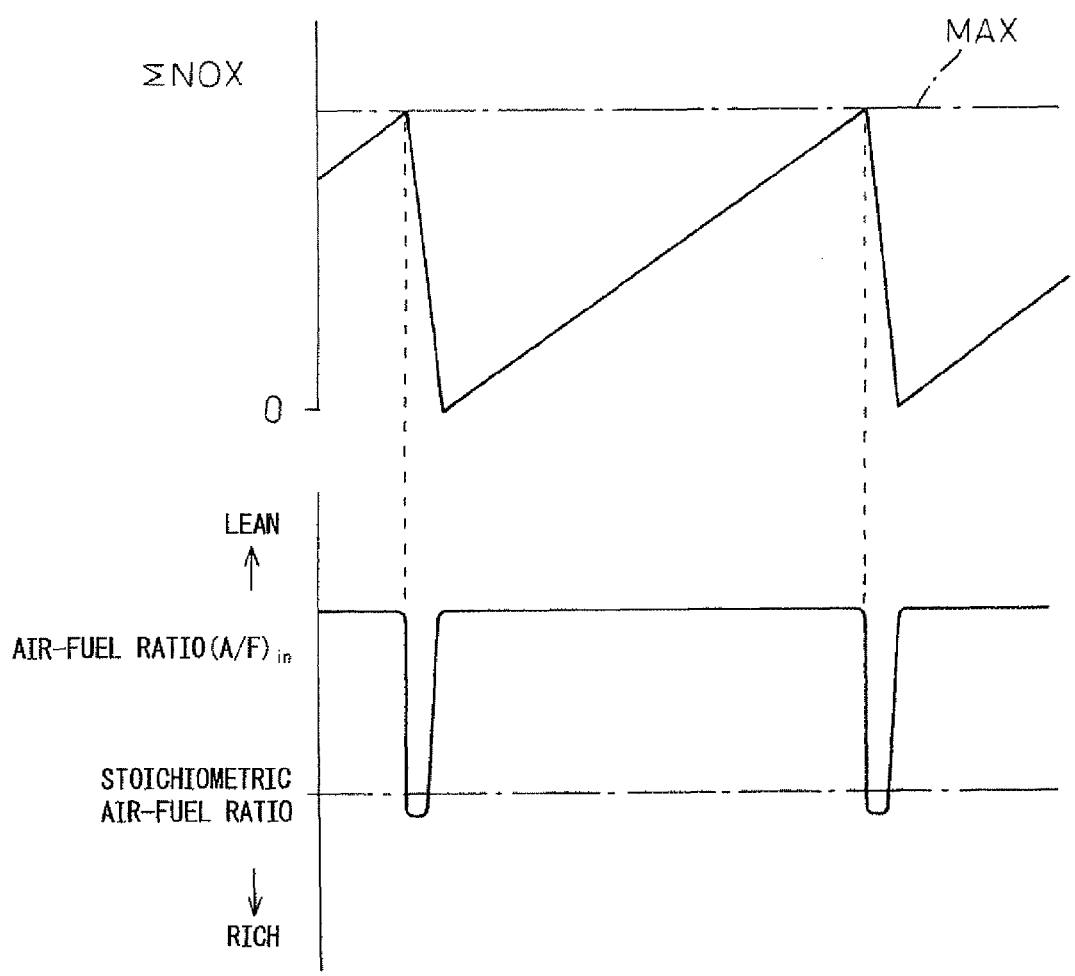
FIG. 16 is view which shows a change in the air-fuel ratio of the exhaust gas which flows into the exhaust purification catalyst, etc., in the second $NO_x$ purification method.

FIG. 16 shows a time chart of the time when removing $NO_x$ by the second purification method. In the second $NO_x$ purification method, when the stored $NO_x$ amount $\Sigma NOX$ which is stored in the basic layer 53 exceeds a predetermined allowable amount MAX, the air-fuel ratio $(A/F)_{in}$ of the exhaust gas which flows into the exhaust purification catalyst 13 is temporarily made rich. If the air-fuel ratio $(A/F)_{in}$ of the exhaust gas is made rich, the $NO_x$ which is stored in the basic layer 53 when the air-fuel ratio $(A/F)_{in}$ of the exhaust gas is lean, is released all at once and reduced from the basic layer 53. Due to this, the $NO_x$ is removed.

Figure 17:
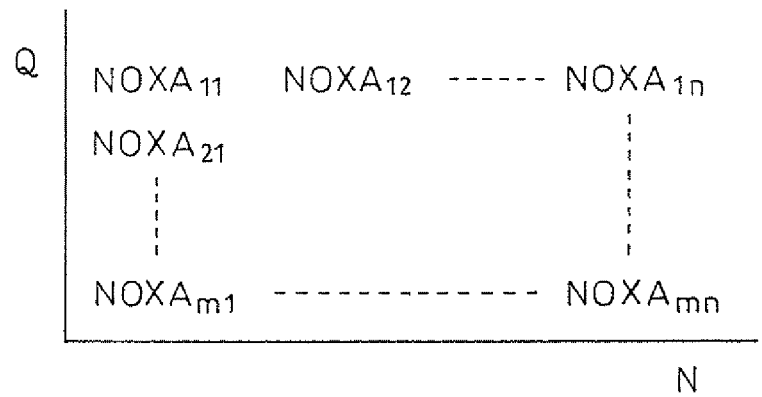
FIG. 17 is a view which shows a map of an exhausted $NO_x$ amount NOXA.

The stored $NO_x$ amount $\Sigma NOX$ is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 17 in advance in the ROM 32. The stored $NO_x$ amount $\Sigma NOX$ is calculated from exhausted $NO_x$ amount NOXA. In this case, as explained before, the period in which the air-fuel ratio $(A/F)_{in}$ of the exhaust gas is made rich is usually 1 minute or more.

Figure 18:
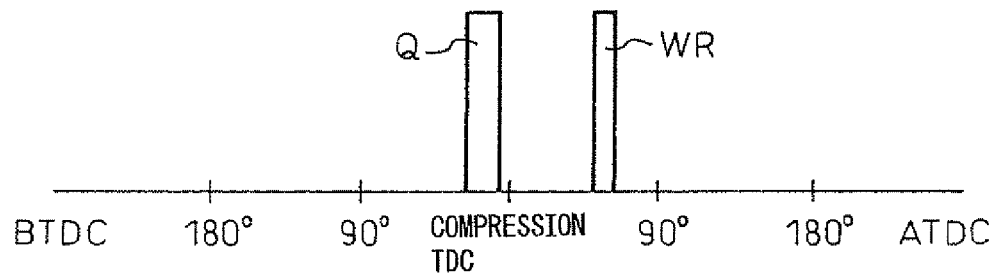
FIG. 18 is a view which shows a fuel injection timing in a combustion chamber in the second $NO_x$ purification method.
Figure 19:
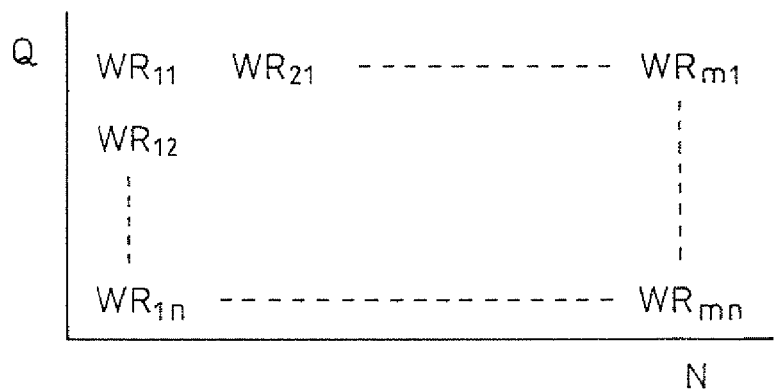
FIG. 19 is a view which shows a map of the feed amount of hydrocarbons WR in the second $NO_x$ purification method.

In this second $NO_x$ purification method, as shown in FIG. 18, in a combustion chamber 2, a fuel injector 3 injects additional fuel WR in addition to the combustion-use fuel Q so that the air-fuel ratio $(A/F)_{in}$ of the exhaust gas flowing into the exhaust purification catalyst 13 is made rich. Note that, FIG. 18, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 19 in advance in the ROM 32. Of course, in this case, it is also possible to make the amount of feed of hydrocarbons from the hydrocarbon feed valve 15 increase so as to make the air-fuel ratio $(A/F)_{in}$ of the exhaust gas rich.

Now, returning again to the explanation of the first $NO_x$ purification method, to use the first $NO_x$ purification method to remove the $NO_x$ well as explained before, the amplitude $\Delta H$ and vibration period $\Delta T$ of the hydrocarbon concentration have to be suitably controlled. That is, to use the first $NO_x$ purification method to remove the $NO_x$ well, the air-fuel ratio $(A/F)_{in}$ of the exhaust gas which flows into the exhaust purification catalyst 13 has to be made the requested minimum air-fuel ratio X or less by control of the amplitude $\Delta H$ of the hydrocarbon concentration and by control of the vibration period $\Delta T$ of the hydrocarbon concentration to 0.3 second to 5 seconds.

In this case, in the present invention, the amplitude $\Delta H$ of the hydrocarbon concentration is controlled by controlling the injection amount of hydrocarbons from the hydrocarbon feed valve 15, while the vibration period $\Delta T$ of the hydrocarbon concentration is controlled by controlling the injection period of hydrocarbons from the hydrocarbon feed valve 15. Note that, in this case, the injection amount of hydrocarbons from the hydrocarbon feed valve 15 can be controlled by changing at least one of the hydrocarbon injection time or injection pressure from the hydrocarbon feed valve 15.

In this regard, when the first $NO_x$ purification method is used for an $NO_x$ purification action, what is most demanded is that it be able to obtain the highest $NO_x$ purification rate no matter what the operating state and that the fed hydrocarbons not pass straight through the exhaust purification catalyst 13. The inventors repeatedly studied this point and as a result learned that in the exhaust purification catalyst 13, the amount of completely oxidized hydrocarbons and the amount of partially oxidized hydrocarbons govern the $NO_x$ purification rate and the amount of hydrocarbons passing straight through. Next, this will be explained with reference to FIG. 20.

Figure 20:
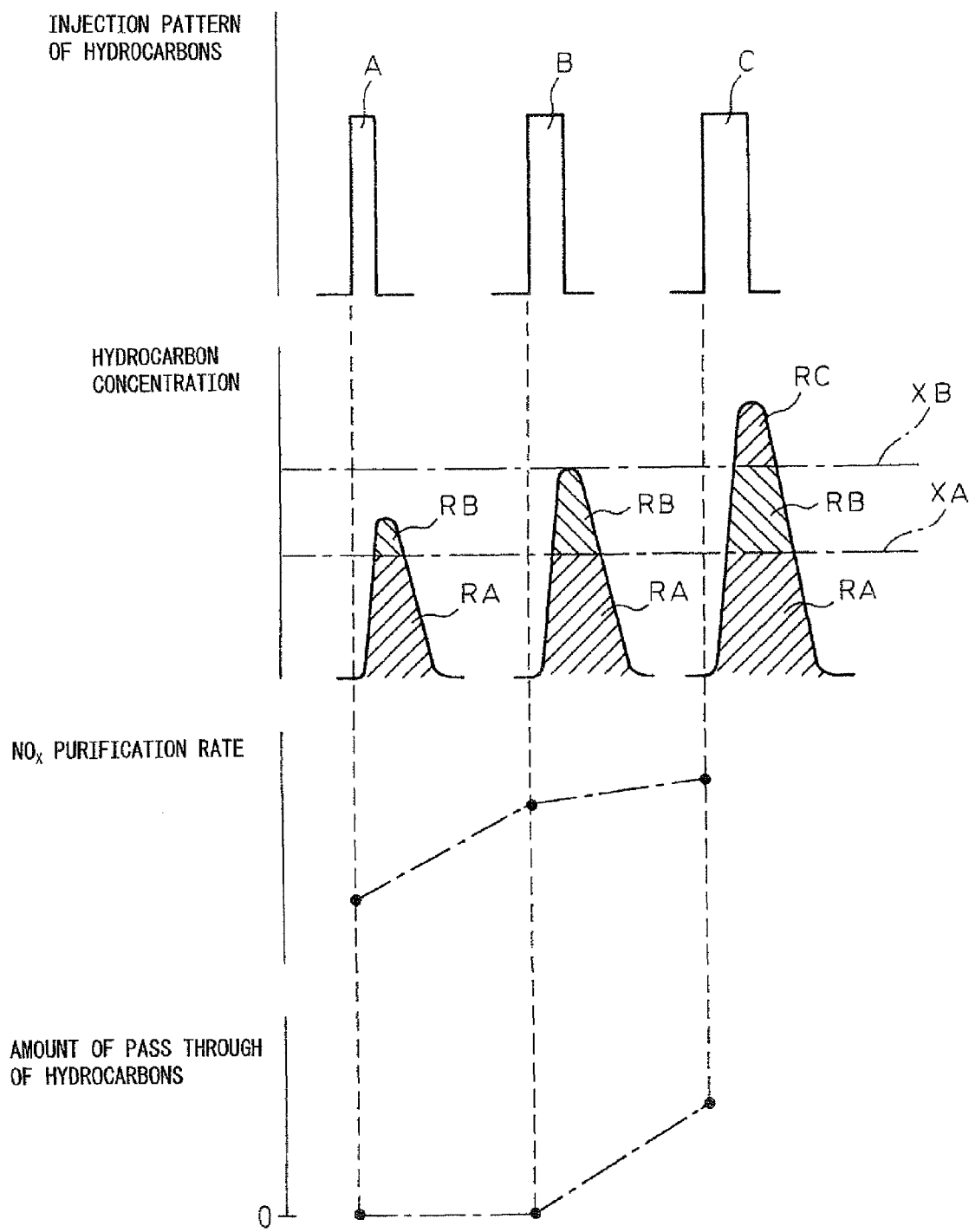
FIG. 20 is a view which shows injection patterns of hydrocarbons from a hydrocarbon feed valve and a change in hydrocarbon concentration in the exhaust gas which flows into the exhaust purification catalyst, etc., in the first $NO_x$ purification method.

FIG. 20 shows the three injection patterns A, B, and C of hydrocarbons which are injected by different injection times from the hydrocarbon feed valve under the same injection pressure. In this case, the injection time is the shortest in the injection pattern A and is longest in the injection pattern C. Further, FIG. 20 shows the temporal change in hydrogen concentration in the exhaust gas which flows into the exhaust purification catalyst 13 after injection by the injection patterns A, B, and C. Furthermore, FIG. 20 shows the $NO_x$ purification rate and amount of hydrocarbons passing straight through the exhaust purification catalyst 13 at the time of injection by the injection patterns A, B, and C.

Now, when the hydrogen concentration in the exhaust gas which flows into the exhaust purification catalyst 13, that is, the amount of hydrocarbons per unit amount of exhaust gas is small, the hydrocarbons end up being completely oxidized at the exhaust purification catalyst 13. On the other hand, if the hydrogen concentration in the exhaust gas, that is, the amount of hydrocarbons per unit amount of exhaust gas, increases, in the exhaust purification catalyst 13, all of the hydrocarbons can no longer be completely oxidized. At this time, part of the hydrocarbons is partially oxidized. In this way, in the hydrogen concentration in the exhaust gas, there is a limit up to where all of the hydrocarbons are completely oxidized in the exhaust purification catalyst 13. This limit is shown in FIG. 20 by XA.

That is, in FIG. 20, when the hydrocarbon concentration is lower than the limit XA, all of the hydrocarbons is completely oxidized, so in FIG. 20, in the hatching region RA below the limit XA, all of the hydrocarbons is completely oxidized. In this case, the area of the hatching region RA expresses the amount of hydrocarbons. Therefore, the amount of hydrocarbons corresponding to the hatching region RA is completely oxidized. Note that, below, this limit XA will be called the "complete oxidation limit".

On the other hand, in FIG. 20, in the region RB above the complete oxidation limit XA, a partial oxidation action of hydrocarbons is performed in the exhaust purification catalyst 13. In this case, in FIG. 20, the hatching region RB expresses the amount of partially oxidized hydrocarbons. The reducing intermediate is produced from the partially oxidized hydrocarbons, so the $NO_x$ purification action is performed by the first $NO_x$ purification method by the partially oxidized hydrocarbon. Note that, in actuality, part of the partially oxidized hydrocarbons ends up being oxidized without being used for production of the reducing intermediate, while the remaining partially oxidized hydrocarbons are used to form the reducing intermediate.

On the other hand, if the hydrogen concentration in the exhaust gas which flows into the exhaust purification catalyst 13, that is, the amount of hydrocarbons per unit amount of exhaust, is further increased, part of the hydrocarbons is not completely oxidized in the exhaust purification catalyst 13 and further is not even partially oxidized. In this case, the part of the hydrocarbons not oxidized passes straight through the exhaust purification catalyst 13. This limit of hydrocarbons causing hydrocarbons to pass straight through is shown in FIG. 20 by XB. Below, this limit XB will be referred to as the "pass through limit". In FIG. 20, the hatching region RC above this pass through limit XB expresses the amount of hydrocarbons passing straight through.

To remove $NO_x$ which is contained in exhaust gas using the first $NO_x$ purification method, it is necessary that a sufficient amount of hydrocarbons for the amount of $NO_x$ which is contained in the exhaust gas be partially oxidized. If the amount of partially oxidized hydrocarbons RB is insufficient, the $NO_x$ purification rate will fall. In FIG. 20, the injection pattern A shows the case where, in this way, the amount of partially oxidized hydrocarbons RB is insufficient. In this case, as shown in FIG. 20, the $NO_x$ purification rate will fall.

On the other hand, in FIG. 20, the injection pattern B shows the case where the injection time is made longer than in the injection pattern A so as to increase the amount of partially oxidized hydrocarbons RB. If the injection time is made longer, the amount of partially oxidized hydrocarbons RB is increased, so, as shown in FIG. 20, the $NO_x$ purification rate becomes higher. Note that, FIG. 20 shows the case where even with the injection pattern B, the amount of partially oxidized hydrocarbons RB is somewhat insufficient.

In FIG. 20, the injection pattern C shows the case where to further increase the amount of partially oxidized hydrocarbons RB, the injection time is made longer compared with the injection pattern B. In this case, as shown in FIG. 20, the $NO_x$ purification rate is improved. However, in this case, the hydrocarbon concentration exceeds the pass through limit XB, so the hydrocarbons pass straight through.

Now, if the temperature of the exhaust purification catalyst 13 rises, the amount of hydrocarbons which are oxidized at the exhaust purification catalyst 13 per unit time increases, that is, the oxidation speed at the hydrocarbons increases. As a result, if the temperature of the exhaust purification catalyst 13 rises, the complete oxidation limit XA rises. On the other hand, if the temperature of the exhaust purification catalyst 13 rises, the hydrocarbons which passed through before the temperature rose become partially oxidized, so the pass through limit XB also rises. That is, if the temperature of the exhaust purification catalyst 13 rises, both the complete oxidation limit XA and the pass through limit XB rise. Therefore, when using the first $NO_x$ purification method for removal of the $NO_x$, it is necessary to consider this for control of injection of the hydrocarbons.

Figure 21:
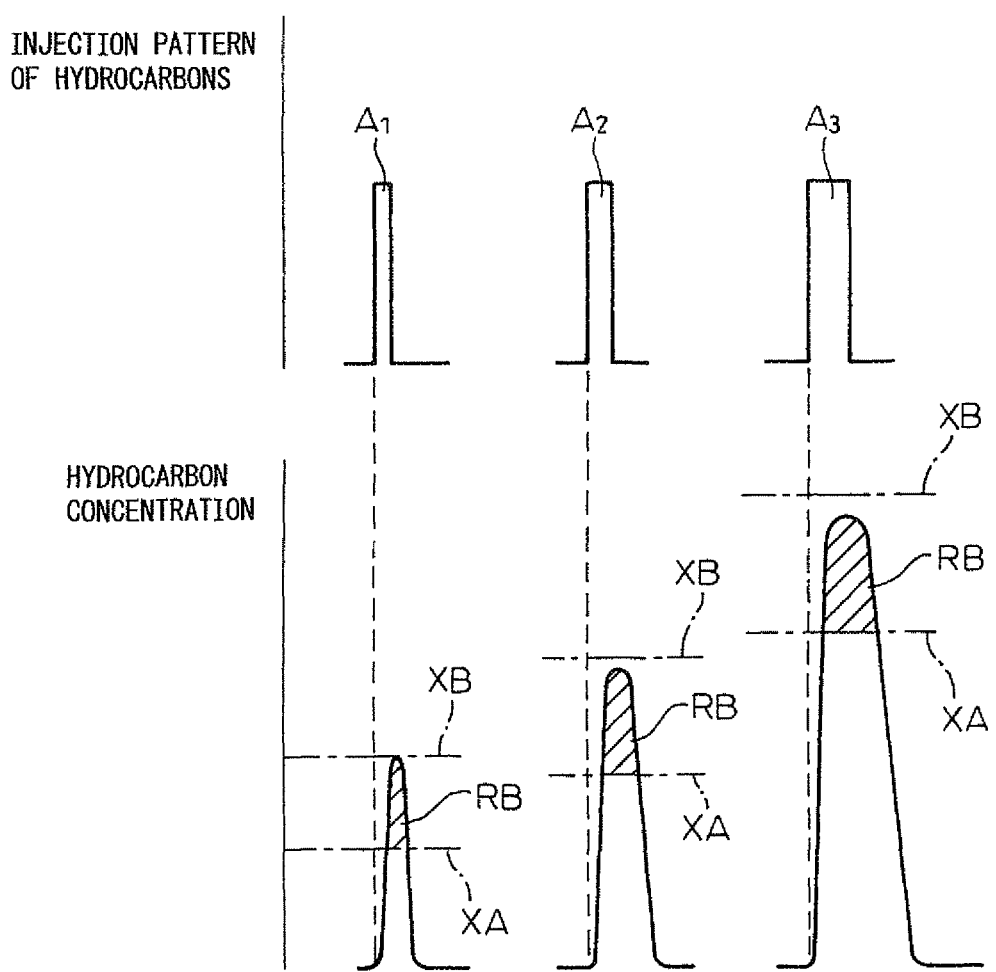
FIG. 21 is a view which explains injection patterns of hydrocarbons and a change in the hydrocarbon concentration when the operating state of the internal combustion engine changes in the first $NO_x$ purification method.

FIG. 21 shows one example when considering this for control of injection of hydrocarbons. Note that, the example shown in FIG. 21 shows the case where the injection pressure is maintained constant and the injection time is controlled in that state so as to control the injection amount of hydrocarbons. In the control of the injection amount of hydrocarbons, it is also possible to control the injection pressure so as to adjust the injection amount of hydrocarbons.

In FIG. 21, the injection pattern $A_1$ shows when the engine speed and load are relatively low, the injection pattern $A_3$ shows when the engine speed and load are relatively high, and the injection pattern $A_2$ shows when the engine speed and load are respectively between the case shown by $A_1$ and the case shown by $A_3$. That is, as the engine speed and load become higher, the injection pattern is made to change from $A_1$ toward $A_3$.

Now, the higher the engine speed and load, the higher the temperature of the exhaust purification catalyst 13 becomes. Therefore, the higher the engine speed and load, the higher the complete oxidation limit XA and pass through limit XB as well. On the other hand, the higher the speed and load, the greater the amount of $NO_x$ exhausted from the engine per unit time. Therefore, the higher the engine speed and load, the greater the amount RB of partially oxidized hydrocarbons has to be made. In this case, to make the amount RB of partially oxidized hydrocarbons increase, the injection amount of hydrocarbons has to be increased. Therefore, to enable the production of the amount of partially oxidized hydrocarbons required for removal of $NO_x$, in the example shown in FIG. 21, the higher the engine speed and load, the longer the injection time is made so as to make the injection amount increase.

Next, the control for normal operation of the present embodiment will be explained. Here, the "normal operation of the internal combustion engine" indicates the state where the engine body is controlled in accordance with the requested load. For example, the operating state for regeneration of the particulate filter, explained later, etc. are excluded from "normal operation". In an exhaust purification system of an internal combustion engine in the present embodiment, the $NO_x$ amount which is held at the exhaust purification catalyst and the $NO_x$ holding speed are estimated and the estimated $NO_x$ amount and $NO_x$ holding speed are used as the basis to set the timing of feed of hydrocarbons from the hydrocarbon feed valve and the feed amount of hydrocarbons.

Referring to FIG. 6A and FIG. 6B, as explained earlier, in the first $NO_x$ purification method, active $NO_x$ is formed in the state where the exhaust gas which flows into the exhaust purification catalyst 13 becomes oxygen rich. By having the active $NO_x$ held on the surface of the basic layer 53, the $NO_x$ which is contained in the exhaust gas can be removed.

In this regard, there is a limit to the holding ability of the exhaust purification catalyst 13 which holds the $NO_x$ in the exhaust gas on the surface of the basic layer. If the holding ability becomes small, the $NO_x$ can no longer be sufficiently removed from the exhaust gas. For example, there is a limit to the held active $NO_x$ amount of the exhaust purification catalyst 13. The larger the held active $NO_x$ amount the less the holding speed of the $NO_x$ which is contained in the exhaust, that is, the $NO_x$ holding speed, falls. If the $NO_x$ holding speed falls, the amount of $NO_x$ which cannot be held at the exhaust purification catalyst and passes straight through the exhaust purification catalyst increases. In this way, if the $NO_x$ holding speed falls, the $NO_x$ purification rate falls.

The exhaust purification catalyst 13 in the present embodiment has a maximum amount of $NO_x$ which it can hold per unit time, that is, a holdable speed. The holdable speed is dependent on the state of the exhaust purification catalyst, the operating state of the engine body, and other aspects of the operating state of the internal combustion engine. In the operational control of the exhaust purification system in the present embodiment, the holdable speed is estimated during the time period when the first $NO_x$ purification method is being performed. The estimated holdable speed is used as the basis to estimate the holding ability of the exhaust purification catalyst 13. The estimated holding ability is used as the basis to set the timing for feed of hydrocarbons from the hydrocarbon feed valve 15. In the present embodiment, as the $NO_x$ holding ability of the exhaust purification catalyst 13, the $NO_x$ purification rate of the exhaust purification catalyst 13 is employed. When the $NO_x$ which flows into the exhaust purification catalyst can no longer be removed by the predetermined purification rate, control is performed to feed hydrocarbons from the hydrocarbon feed valve.

Figure 22:
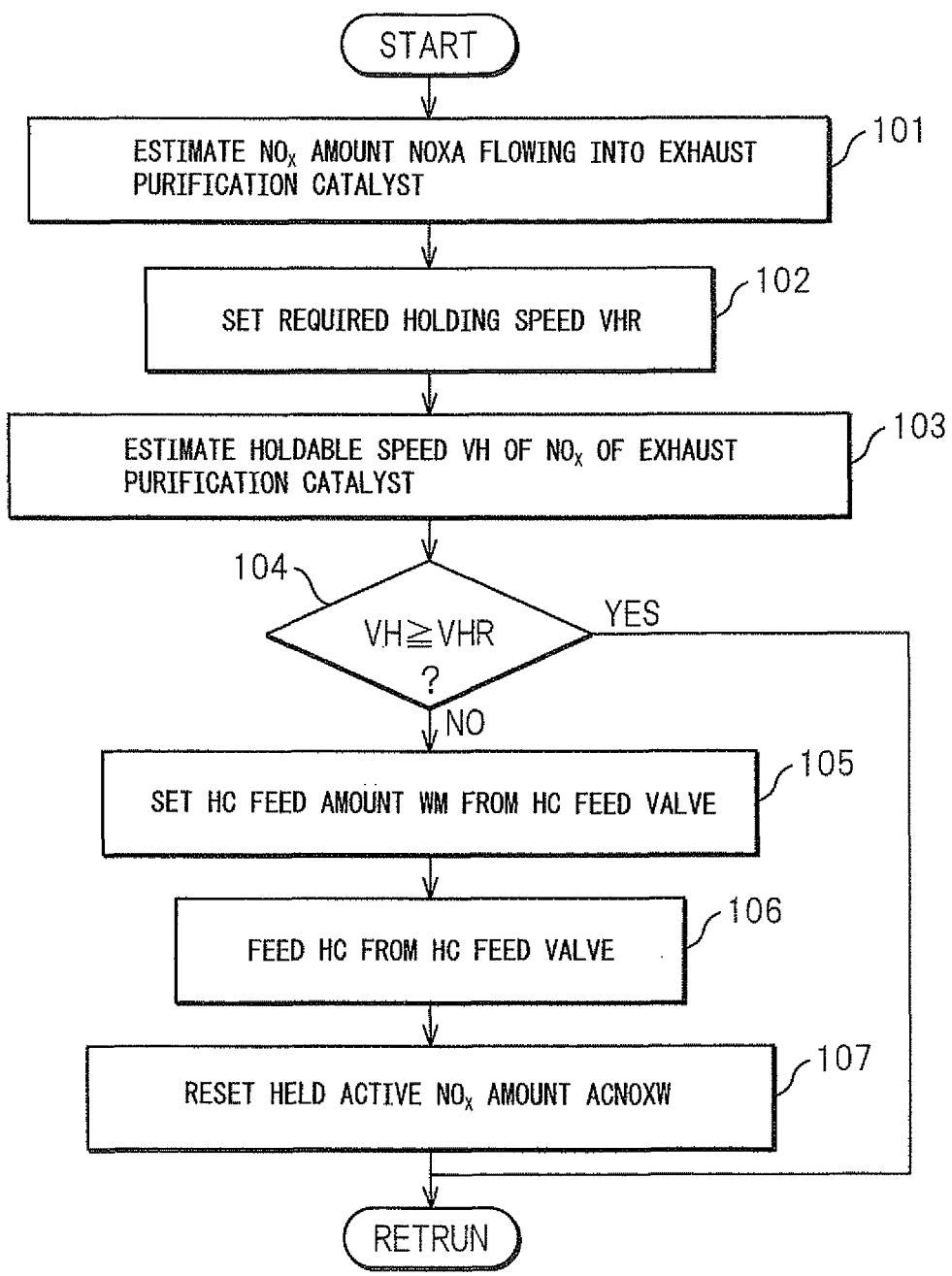
FIG. 22 is a flowchart of operational control of the first $NO_x$ purification method at the time of normal operation.

FIG. 22 is a flowchart of operational control at the time of normal operation of the internal combustion engine in the present embodiment. The control which is shown in FIG. 22 can for example be performed repeatedly every predetermined time interval.

At step 101, the $NO_x$ amount NOXA which flows into the exhaust purification catalyst per unit time is estimated. In the present embodiment, the $NO_x$ amount which flows into the exhaust purification catalyst per unit time becomes equal to the $NO_x$ amount NOXA which is exhausted from the engine body per unit time. For this reason, the $NO_x$ amount NOXA which flows into the exhaust purification catalyst 13 per unit time can, for example, be estimated by a map which is shown in FIG. 17 as a function of the engine speed N and the fuel injection amount Q in a combustion chamber.

At step 102, the requested holding speed VHR for removing the $NO_x$ which is contained in the exhaust gas by a desired purification rate or more is set. In the present embodiment, the requested holding speed VHR can be set by multiplying the $NO_x$ amount NOXA which flows into the exhaust purification catalyst per unit time with a predetermined purification rate.

Next, at step 103, the holdable speed VH of the $NO_x$ of the exhaust purification catalyst is estimated. That is, the maximum amount of $NO_x$ which can be removed from the exhaust gas per unit time by the exhaust purification catalyst 13 is estimated.

Figure 23:
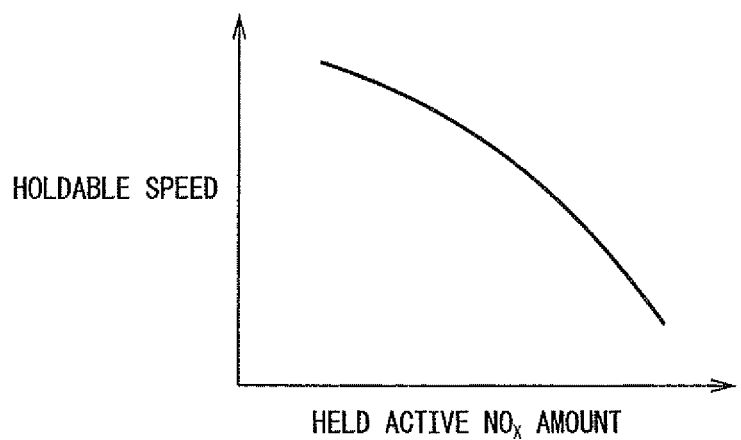
FIG. 23 is a graph which explains a relationship between a held active $NO_x$ amount and $NO_x$ holdable speed of an exhaust purification catalyst.

FIG. 23 is a graph which shows the relationship between the held active $NO_x$ amount and the holdable speed VH of the exhaust purification catalyst in the present embodiment. The holdable speed of the exhaust purification catalyst 13 depends on the $NO_x$ amount which is held at the exhaust purification catalyst 13, that is, the held active $NO_x$ amount. The larger the held active $NO_x$ amount, the smaller the holdable speed. For this reason, it is possible to use the held active $NO_x$ amount as the basis to estimate the holdable speed VH.

In the present embodiment, the held active $NO_x$ amount ACNOXW which is estimated every predetermined time interval is read. The control for estimating the held active $NO_x$ amount every predetermined time interval will be explained later. It is possible to use the held active $NO_x$ amount which is stored in the electronic control unit 30 as the basis to estimate the holdable speed VH of the exhaust purification catalyst 13.

In this regard, the holdable speed of $NO_x$ of the exhaust purification catalyst also depends on aspects of the operating state of the internal combustion engine other than the held active $NO_x$ amount. For example, the holdable speed of the exhaust purification catalyst depends on the spatial velocity at the exhaust purification catalyst, the temperature of the exhaust purification catalyst, etc. For this reason, it is possible to detect the operating state of the internal combustion engine and to use the detected operating state of the internal combustion engine as the basis to correct the holdable speed.

Next, the control for estimating the held $NO_x$ amount of the exhaust purification catalyst in the first $NO_x$ purification method will be illustrated.

Figure 24:
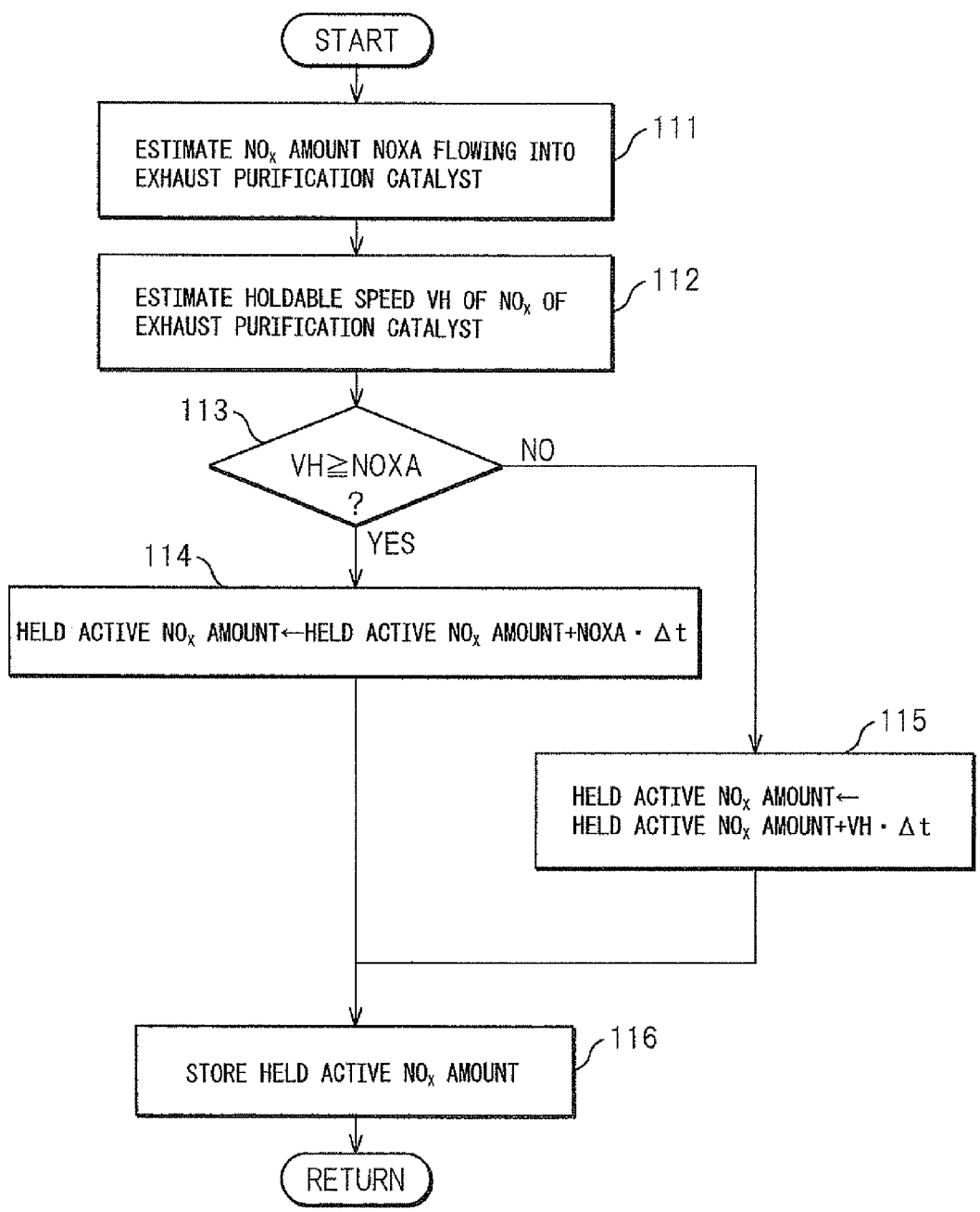
FIG. 24 is a flowchart of control which estimates the held active $NO_x$ amount of an exhaust purification catalyst.

FIG. 24 is a flowchart of control for estimating the held active $NO_x$ amount which is held at the exhaust purification catalyst. The control for estimating the held active $NO_x$ amount can be performed independently from the control for feeding hydrocarbons which is shown in FIG. 22. In the present embodiment, the holdable speed VH of $NO_x$ of the exhaust purification catalyst is used to estimate the held active $NO_x$ amount.

At step 111, the $NO_x$ amount NOXA which flows into the exhaust purification catalyst per unit time is estimated. Next, at step 112, the holdable speed VH of $NO_x$ of the exhaust purification catalyst is estimated. Here, as the holdable speed VH of $NO_x$ for example, it is possible to use the holdable speed VH of $NO_x$ which is estimated most recently.

Next, at step 113, it is judged if the holdable speed of $NO_x$ of the exhaust purification catalyst is the $NO_x$ amount NOXA which flows into the exhaust purification catalyst per unit time or more. When, at step 113, the holdable speed VH is the $NO_x$ amount NOXA which flows in per unit time or more, the routine proceeds to step 114. In this case, it is possible to judge that the holdable speed of $NO_x$ of the exhaust purification catalyst is large and substantially all of the $NO_x$ amount which flows into the exhaust purification catalyst is held at the exhaust purification catalyst.

At step 114, the $NO_x$ amount NOXA which flows into the exhaust purification catalyst per unit time is multiplied with the elapsed time $\Delta t$ from the previous calculation of the held active $NO_x$ amount so as to calculate the amount of increase of the active $NO_x$. By adding the amount of increase (NOXA·$\Delta t$) of the active $NO_x$ to the previously calculated held active $NO_x$ amount ACNOXW, it is possible to calculate the current held active $NO_x$ amount.

When, at step 113, the holdable speed VH of $NO_x$ is less than the $NO_x$ amount NOXA which flows into the exhaust purification catalyst per unit time, the routine proceeds to step 115. In this case, it is possible to judge that the $NO_x$ holding ability of the exhaust purification catalyst is smaller than the $NO_x$ amount which flows into the exhaust purification catalyst.

At step 115, it is possible to multiple the $NO_x$ holdable speed VH with the elapsed time $\Delta t$ from the previous calculation of the held active $NO_x$ amount to calculate the amount of increase (VH·$\Delta t$) of the active $NO_x$. The calculated amount of increase of the active $NO_x$ may be added to the previous held active $NO_x$ amount ACNOXW so as to calculate the current held active $NO_x$ amount ACNOXW.

At step 116, the held active $NO_x$ amount ACNOXW which is calculated by the current calculation is stored in the electronic control unit.

In this way, in estimation of the held active $NO_x$ amount ACNOXW, it is possible to estimate the newly held active $NO_x$ amount and add the newly held active $NO_x$ amount to the held active $NO_x$ amount of the previous calculation so as to estimate the held active $NO_x$ amount at different timings. Further, estimation of the held active $NO_x$ amount of the exhaust purification catalyst is not limited to this mode. Any control may be used to estimate the held active $NO_x$ amount.

Referring to FIG. 22, next, at step 104, it is judged if the holdable speed VH of the $NO_x$ of the exhaust purification catalyst is the requested holdable speed VHR or more. When the holdable speed VH of the $NO_x$ is the requested holdable speed VHR or more, the $NO_x$ holding ability of the exhaust purification catalyst is high, so it can be judged in the current control not to feed hydrocarbons from the hydrocarbon feed valve. In this case, the current operational control is ended.

When, at step 104, the holdable speed VH of the $NO_x$ of the exhaust purification catalyst is less than the requested holdable speed VHR, the routine proceeds to step 105. In this case, it can be judged that the $NO_x$ purification rate of the exhaust purification catalyst has become less than the desired $NO_x$ purification rate. It is possible to judge that the $NO_x$ holding ability of the exhaust purification catalyst has become less than the predetermined judgment value of the holding ability. For this reason, control is performed to feed hydrocarbons from the hydrocarbon feed valve and remove the active $NO_x$ which is held on the exhaust purification catalyst by reduction.

At step 105, the feed amount of hydrocarbons WM which is fed from the hydrocarbon feed valve is set. In the exhaust purification system of the present embodiment, the held active $NO_x$ amount of the exhaust purification catalyst is used as the basis to set the current feed amount of hydrocarbons WM.

Figure 25:
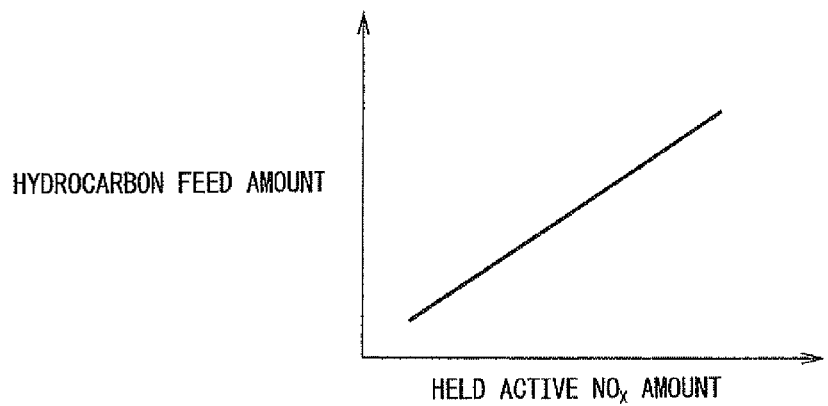
FIG. 25 is a graph which explains a relationship between a held active $NO_x$ amount and a feed amount of hydrocarbons.

FIG. 25 is a graph which explains the relationship of the feed amount of hydrocarbons to the held active $NO_x$ amount which is held at the exhaust purification catalyst. The greater the held active $NO_x$ amount ACNOXW, the larger the feed amount of hydrocarbons WM which are fed to the exhaust purification catalyst can be set to. The held active $NO_x$ amount may be used as the basis to set the feed amount of hydrocarbons WM. In the present embodiment, the feed amount of hydrocarbons is set so as to enable substantially all of the active $NO_x$ which is held at the exhaust purification catalyst to be removed.

In this regard, the efficiency of production of the reducing intermediate changes in accordance with the operating state of the internal combustion engine. Therefore, in setting the feed amount of hydrocarbons, the operating state of the internal combustion engine may also be used as the basis to correct the feed amount of hydrocarbons. For example, as the operating state of the internal combustion engine, it is also possible to estimate the oxygen concentration of the exhaust gas which flows into the exhaust purification catalyst or the spatial velocity at the exhaust purification catalyst etc. and use the estimated oxygen concentration etc. as the basis to correct the feed amount of hydrocarbons.

Referring to FIG. 22, at step 105, after setting the feed amount of hydrocarbons WM, at step 106, hydrocarbons are fed from the hydrocarbon feed valve by the set feed amount of hydrocarbons. By feeding hydrocarbons to the exhaust purification catalyst, it is possible to remove $NO_x$ from the exhaust purification catalyst.

Next, at step 107, the held active $NO_x$ amount ACNOXW of the exhaust purification catalyst is reset. In the present embodiment, the feed amount of hydrocarbons which are fed from the hydrocarbon feed valve is set to an amount which enables substantially all of the active $NO_x$ which is held at the exhaust purification catalyst to be removed. For this reason, in the present embodiment, control is performed to make the held active $NO_x$ amount of the exhaust purification catalyst zero.

In this way, in normal operation of the internal combustion engine of the present embodiment, the held active $NO_x$ amount and holdable speed of $NO_x$ are used as the basis to set the feed timing of hydrocarbons and the feed amount of hydrocarbons. Due to this control, it is possible to keep the feed amount of hydrocarbons from becoming too small and the active $NO_x$ which is held at the exhaust purification catalyst from not being able to be sufficiently reduced and to keep the feed amount of hydrocarbons from becoming too great and the hydrocarbons from being wastefully consumed.

By controlling normal operation in the present embodiment, when operating the engine by a high load and high speed, the feed period when feeding hydrocarbons to the engine exhaust passage becomes shorter and, furthermore, the feed amount of hydrocarbons per feed operation becomes greater. On the other hand, when operating it by a low load and low speed, the feed period when feeding hydrocarbons becomes longer and, furthermore, the feed amount of hydrocarbons per feed operation becomes smaller.

In the above-mentioned operational control, the $NO_x$ purification rate is employed as the $NO_x$ holding ability of the exhaust purification catalyst, but the invention is not limited to this. For example, it is possible to estimate the held $NO_x$ amount which is held on the surface of the basic layer and, when the estimated held $NO_x$ amount exceeds a predetermined judgment value of the held $NO_x$ amount, judge that the $NO_x$ holding ability of the exhaust purification catalyst has become less than the judgment value of the holding ability.

Referring to FIG. 1, an exhaust purification system of an internal combustion engine in the present embodiment is provided with a post treatment device comprised of a particulate filter 14. The particulate filter 14 is arranged downstream of the exhaust purification catalyst 13. If continuing to operate the internal combustion engine, the particulate matter will build up on the particulate filter 14. The amount of buildup of particulate matter can, for example, be estimated by the differential pressure before and after the particulate filter 14 which is detected by a differential pressure sensor 24. In the present embodiment, when a predetermined amount of particulate matter builds up on the particulate filter 14, the temperature of the particulate filter 14 is raised to remove the particulate matter by oxidation so as to regenerate the filter. When regenerating the particulate filter 14, temperature elevation control is performed to make the temperature of the particulate filter 14 rise to the target temperature.

The exhaust purification catalyst of the present embodiment has the function of oxidizing the hydrocarbons. It is possible to feed hydrocarbons to the exhaust purification catalyst 13 and cause an oxidation reaction. In the exhaust purification catalyst 13, due to the oxidation reaction of the hydrocarbons, the temperature of the exhaust gas rises. Due to the high temperature exhaust gas flowing to the particulate filter 14, the particulate filter 14 can be raised to the target temperature. Further, when the particulate filter 14 reaches the target temperature for regeneration, control is performed to maintain the particulate filter 14 at the target temperature.

In the temperature elevation control of the present embodiment, hydrocarbons are fed from the hydrocarbon feed valve while considering the extent of rise of temperature of the exhaust gas with respect to the temperature of exhaust gas which is exhausted from the engine body. The heat which is produced at the exhaust purification catalyst includes the heat which is directly generated by the hydrocarbons being oxidized and the heat which is generated when a reducing intermediate is produced from the hydrocarbons and the reducing intermediate reacts with the active $NO_x$. In each reaction, heat is generated due to an oxidation reaction and can raise the temperature of the exhaust gas which flows into the particulate filter.

As the target temperature of regeneration of the particulate filter, 650° C. may be illustrated. The temperature of the exhaust purification catalyst 13 becomes the temperature corresponding to the target temperature of the particulate filter 14. For this reason, the exhaust purification catalyst 13 also becomes a high temperature. The exhaust purification catalyst 13 in the present embodiment can maintain a high $NO_x$ purification rate even in such a high temperature state (see FIG. 5). In the present embodiment, during the time period of regeneration of the particulate filter 14 as well, $NO_x$ can continue to be removed by a higher purification rate in the exhaust purification catalyst by the first $NO_x$ purification method.

In this regard, in regeneration of the particulate filter 14, to make the temperature of the particulate filter rise, it is necessary to feed an amount of hydrocarbons larger than the feed amount of hydrocarbons which are fed based on the first $NO_x$ purification method at the time of normal operation. For example, in temperature elevation control, it is necessary to set the feed amount of hydrocarbons from the hydrocarbon feed valve per unit time larger than during normal operation.

In the present embodiment, during the time period when removing $NO_x$ by the first $NO_x$ purification method at the time of normal operation, the amount of active $NO_x$ which is carried on the exhaust purification catalyst and the holdable speed of $NO_x$ are estimated to set the timing for feed of hydrocarbons. In the present embodiment, the feed period of hydrocarbons equals the vibration period of the concentration of hydrocarbons. In temperature elevation control, hydrocarbons may be fed corresponding to the feed timing of hydrocarbons when performing the first $NO_x$ purification method. That is, it is possible to make the feed amount of hydrocarbons per feed increase when performing the first $NO_x$ purification method. However, if making the amount required for raising the temperature of the particulate filter increase, the feed amount of hydrocarbons per feed which are fed from the hydrocarbon feed valve will sometimes end up increasing and the hydrocarbons will end up passing straight through the exhaust purification catalyst.

For example, referring to FIG. 20, if like the injection pattern C of hydrocarbons, feeding an amount of hydrocarbons over the pass through limit XB during the first feed of hydrocarbons, as shown in the region RC, hydrocarbons will be produced which end up passing straight through the exhaust purification catalyst 13. In the particulate filter 14, if catalyst particles which have the function of oxidizing hydrocarbons are not carried, the hydrocarbons which pass straight through the exhaust purification catalyst 13 will end up passing straight through the particulate filter 14 as well and being released into the atmosphere. Further, even when the particulate filter 14 carries platinum and other catalyst particles which have an oxidation function, if a large amount of hydrocarbons flow into the particulate filter 14, the hydrocarbons are liable to pass straight through the particulate filter 14 and end up being released into the atmosphere.

Further, when feeding the exhaust purification catalyst 13 a large amount of hydrocarbons at one time, sometimes the exhaust purification catalyst 13 will end up becoming overly hot. For example, when feeding a large amount of hydrocarbons to the exhaust purification catalyst 13 at one time and right after that the engine speed of the internal combustion engine rapidly decreases, the spatial velocity of the exhaust purification catalyst 13 will become smaller and a massive oxidation reaction will arise at one time. As a result, sometimes the temperature of the exhaust purification catalyst 13 rapidly rises. In this way, if feeding a large amount of hydrocarbons to the exhaust purification catalyst 13 at one time, sometimes the temperature controllability of the exhaust purification catalyst 13 deteriorates. The exhaust purification system of an internal combustion engine of the present embodiment keeps hydrocarbons from passing straight through the exhaust purification catalyst and feeds hydrocarbons so as to stabilize the temperature controllability of the catalyst.

Figure 26:
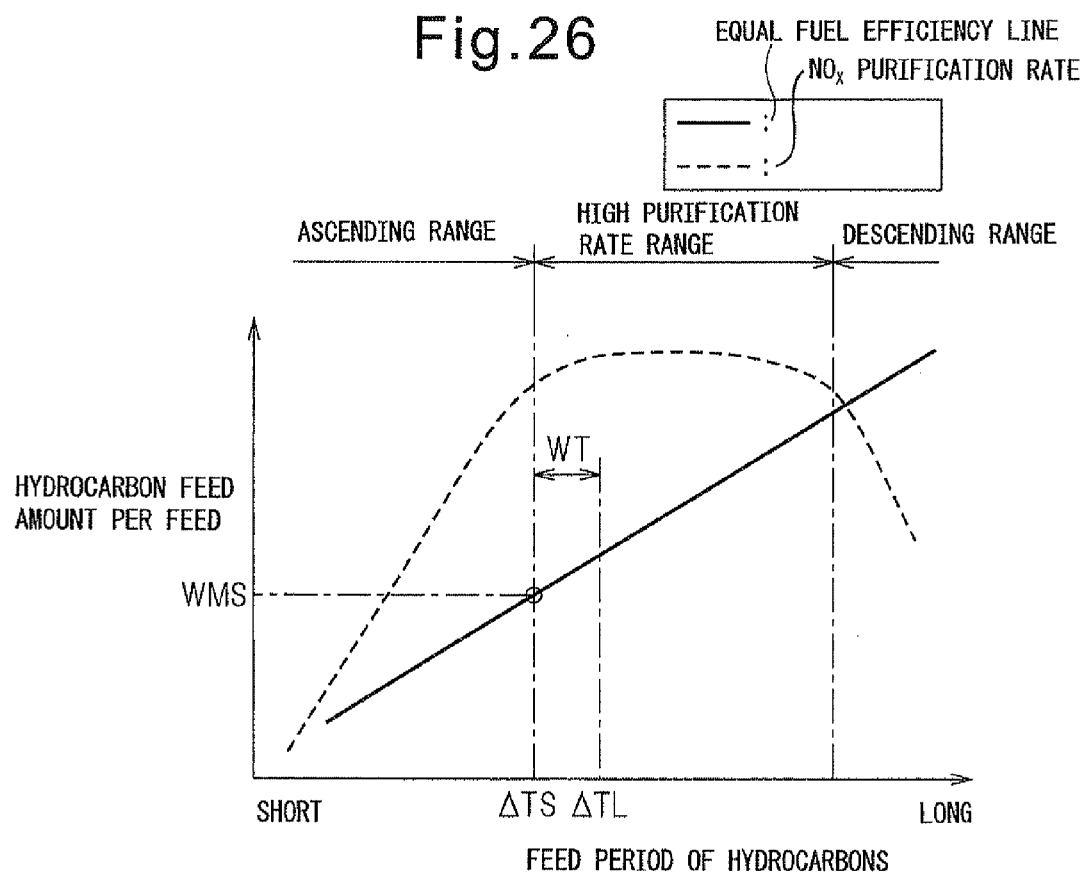
FIG. 26 is a graph which explains a relationship between a feed period of hydrocarbons and a feed amount of hydrocarbons per feed in temperature elevation control of an embodiment.

FIG. 26 is a graph which explains the relationship between the feed period of hydrocarbons and the feed amount of hydrocarbons per feed which are fed from the hydrocarbon feed valve in the temperature elevation control of the present embodiment. FIG. 26 is a graph at one operating state of the internal combustion engine. In the temperature elevation control of the particulate filter in the present embodiment, the current temperature of the particulate filter and the target temperature for regeneration of the particulate filter are used as the basis to set the total feed amount of hydrocarbons which are fed to the exhaust purification catalyst. Further, the time period (length of time) for raising the temperature of the particulate filter is set in advance. In the temperature elevation control of the present embodiment, the total feed amount of hydrocarbons which are fed to the exhaust purification catalyst and the time period for making the temperature rise are used as the basis to set the feed period and the feed amount of hydrocarbons per feed at the time of feeding hydrocarbons.

Here, FIG. 26 shows the equal fuel efficiency line by a solid line. The equal fuel efficiency line shows the feed amount of hydrocarbons per feed when changing the feed period of hydrocarbons under conditions of a constant total feed amount of hydrocarbons and feed time period (length of time of feed operation). The longer the feed period of hydrocarbons $\Delta T$ is made, the greater the feed amount of hydrocarbons WM which are fed from the hydrocarbon feed valve per feed. Further, the longer the feed period of hydrocarbons $\Delta T$ is made, the smaller the number of feeds of hydrocarbons. The feed period of hydrocarbons and the feed amount of hydrocarbons per feed can be selected from any point on the equal fuel efficiency line.

Figure 27:
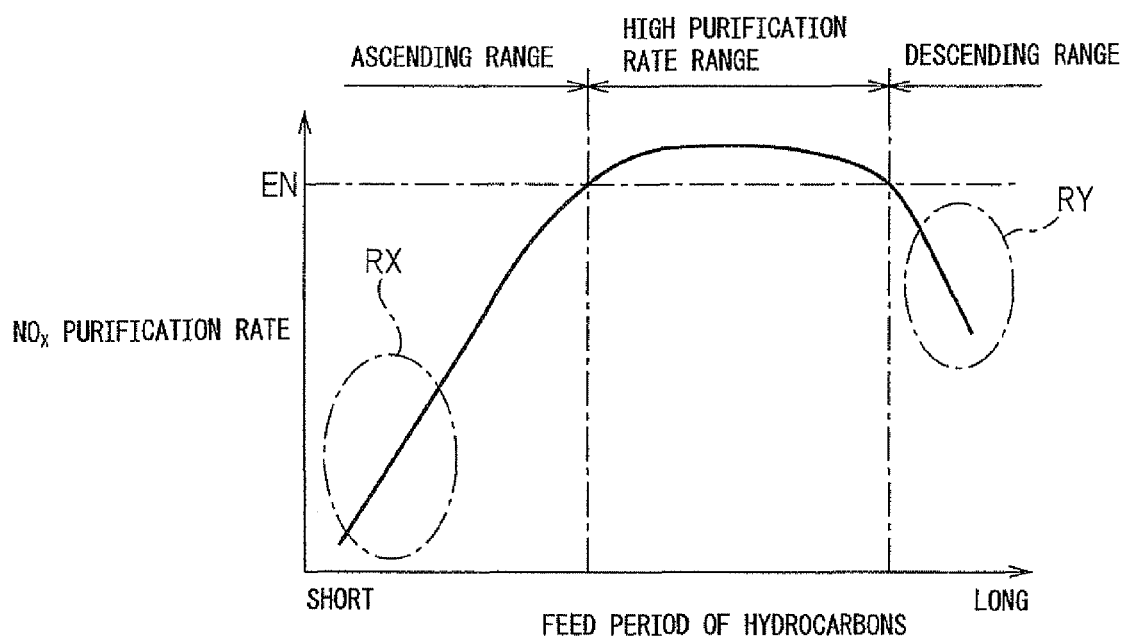
FIG. 27 is a graph which explains a relationship between a feed period of hydrocarbons and an $NO_x$ purification rate in temperature elevation control of an embodiment.

FIG. 27 is a graph which explains the $NO_x$ purification rate at the time of changing the feed period of hydrocarbons in the temperature elevation control of the present embodiment. FIG. 27 is a graph of the time of operation by the same operating state as the operating state of the internal combustion engine in FIG. 26. The exhaust purification catalyst has an ascending range in which the $NO_x$ purification rate rises if gradually changing the feed period of hydrocarbons to become longer and a high purification rate range where the $NO_x$ purification rate becomes a predetermined rate EN or more. In the high purification rate range in the present embodiment, the purification rate becomes substantially constant at a high level. Furthermore, the exhaust purification catalyst has a descending range in which the $NO_x$ purification rate falls the longer the feed period $\Delta T$ of hydrocarbons lengthening the feed period $\Delta T$ of hydrocarbons more than the high purification rate range.

In the region RX of the short feed period $\Delta T$ of hydrocarbons, the feed amount of hydrocarbons per feed becomes smaller, so most of the hydrocarbons which are fed to the exhaust purification catalyst are completely oxidized. For this reason, the partially oxidized radical hydrocarbons become insufficient and the $NO_x$ purification rate falls. In the ascending range, if changing the feed period $\Delta T$ of hydrocarbons to become longer, the feed amount of hydrocarbons per feed will become greater and the amount of partially oxidized hydrocarbons will increase. For this reason, in the ascending range, the longer the feed period $\Delta T$ of hydrocarbons, the more the $NO_x$ purification rate rises.

In the high purification rate range, the partially oxidized hydrocarbons become greater and a high $NO_x$ purification rate can be maintained. In this regard, as shown in the region RY, if the feed period $\Delta T$ of hydrocarbons becomes too long, as explained above, the active $NO_x$ will end up being absorbed inside the basic layer. That is, if the feed period of hydrocarbons becomes too long, the active $NO_x$ ends up no longer being able to be held at the surface of the basic layer. For this reason, in the descending range, the longer the feed period $\Delta T$ of hydrocarbons becomes, the more the $NO_x$ purification rate falls.

FIG. 26 shows the $NO_x$ purification rate which is shown in FIG. 27 by a broken line. In the temperature elevation control in the present embodiment, the feed period $\Delta T$ and the feed amount WM of hydrocarbons per feed are selected in the region where the feed period $\Delta T$ of hydrocarbons becomes short in the high purification rate range where the $NO_x$ purification rate is high.

In the present embodiment, the feed period where the feed period $\Delta T$ of hydrocarbons becomes the shortest in the high purification rate range is called the "specific feed period $\Delta TS$". Further, in the present embodiment, the feed amount of hydrocarbons per feed which corresponds to the specific feed period $\Delta TS$ is called the "specific feed amount WMS". Furthermore, the high purification rate range has a region WT of the end part at the short side of the feed period of hydrocarbons. The region WT of the end part at the short side of the feed period is a region near a specific feed period $\Delta TS$. For the region WT of the end part at the short side of the feed period, it is possible to set a region lengthening the feed period from a specific feed period $\Delta TS$ at predetermined time intervals. As the region WT of the end part at the short side of the feed period, for example, it is possible to illustrate a region of one-quarter of the high purification rate range at the short side of the feed period. In the temperature elevation control in the present embodiment, control is performed to feed hydrocarbons in the range of the region WT of the end part at the short side of the feed period.

By feeding hydrocarbons in the range of the region WT of the end part at the short side of the feed period, the feed amount WM of hydrocarbons per feed can be reduced. By having the feed amount WM of hydrocarbons per feed reduced, it is possible to keep hydrocarbons from passing straight through the exhaust purification catalyst. Alternatively, it is possible to increase the safety margin from the pass through limit of hydrocarbons in the exhaust purification catalyst. Furthermore, since it is possible to reduce the feed amount of hydrocarbons per feed, it is possible to improve the temperature controllability of the exhaust purification catalyst. For example, it is possible to keep the temperature of the exhaust purification catalyst from rapidly rising and becoming overly hot.

Next, an operating example of the temperature elevation control of the exhaust purification system of the present embodiment will be explained. In the operating example, the explanation will be given with reference to the example of the case of employing a specific feed period $\Delta TS$ as the feed period of hydrocarbons. The specific feed amount WMS corresponding to the specific feed period $\Delta TS$ becomes smallest in feed amount of hydrocarbons per feed in the high purification rate range. By employing the specific feed period and the specific feed amount as feed patterns of hydrocarbons, it is possible to keep hydrocarbons from passing straight through more reliably.

Figure 28:
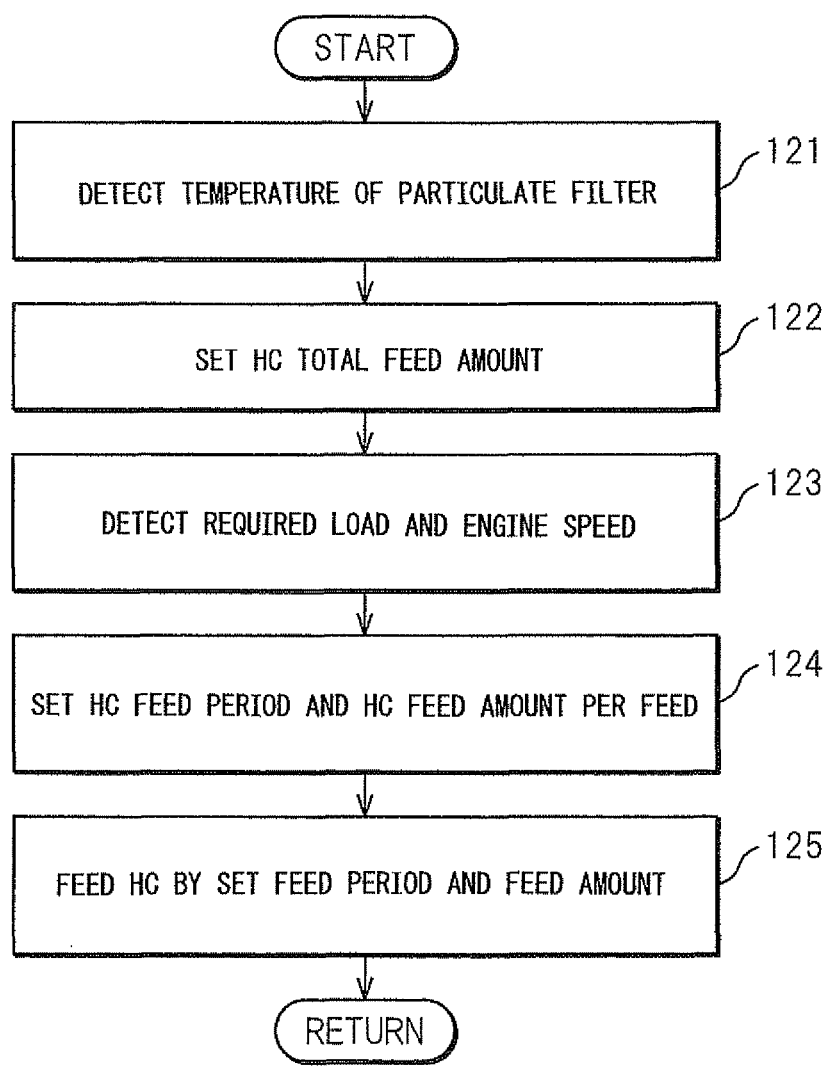
FIG. 28 is a flowchart of temperature elevation control for regenerating the particulate filter in an embodiment.

FIG. 28 shows a flowchart of the temperature elevation control of the exhaust purification system of the present embodiment. The temperature elevation control which is shown in FIG. 28 can, for example, be repeatedly performed every predetermined time interval during the period of regeneration of the particulate filter.

At step 121, the temperature of the particulate filter is detected. Referring to FIG. 1, the temperature of the particulate filter 14 can, for example, be detected by the temperature sensor 23.

Next, at step 122, the total feed amount of hydrocarbons for raising the temperature of the particulate filter is set. The total feed amount of hydrocarbons can be set based on the current temperature of the particulate filter and the target temperature for regeneration. The total feed amount of hydrocarbons HCT can, for example, be calculated by the following formula:

$$HCT = Ga \cdot (TPtrg - TP) \cdot \alpha_{TP} \quad (1)$$

Here, the variable Ga is the intake air flow rate and corresponds to the spatial velocity in the engine exhaust passage. Further, the variable TPtrg is the target temperature of the particulate filter. The variable TP is the current temperature of the particulate filter. The constant $\alpha_{TP}$ is a coefficient for calculating the total feed amount of hydrocarbons HCT.

Next, at step 123, the operating state of the internal combustion engine is detected. The relationship between the feed period of hydrocarbons and the purification rate of $NO_x$ which is shown in the graphs of FIG. 26 and FIG. 27 changes depending on the operating state of the internal combustion engine. By specifying the operating state of the internal combustion engine, as shown in FIG. 26 and FIG. 27, the relationship of the $NO_x$ purification rate with respect to the feed period of hydrocarbons is determined. In the present embodiment, as the operating state of the internal combustion engine, the fuel injection amount Q in a combustion chamber and the engine speed N are detected.

Next, at step 124, the feed period $\Delta T$ of hydrocarbons and the feed amount WM of hydrocarbons per feed in the temperature elevation control are set. Referring to FIG. 26, in the operating example of the present embodiment, a specific feed period $\Delta TS$ and a specific feed amount WMS are set. That is, the feed patterns are set so that the feed period of hydrocarbons is the shortest and the feed amount of hydrocarbons per feed is the smallest in the high purification rate range which is shown in FIG. 26.

Figure 29:
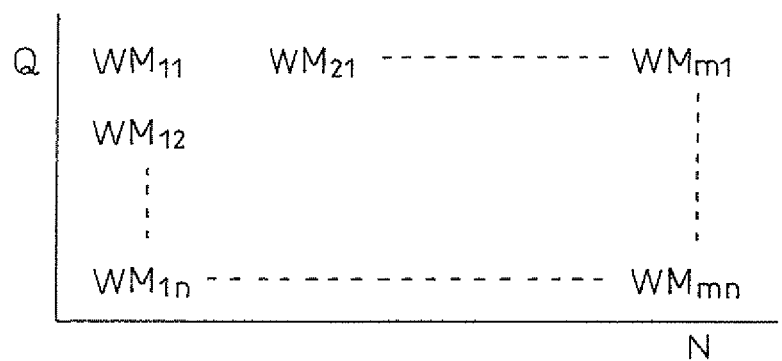
FIG. 29 is a map of a feed amount of hydrocarbons per feed as a function of the engine speed and the fuel injection amount in a combustion chamber.

FIG. 29 shows a map for setting the feed amount of hydrocarbons per feed in the temperature elevation control of the present embodiment. A map of the feed amount WM of hydrocarbons per feed is stored as a function of the engine speed N and the fuel injection amount Q in the combustion chamber in advance in the electronic control unit. By detecting the engine speed N and the fuel injection amount Q, the feed amount WM of hydrocarbons per feed can be set. In the operating example of the present embodiment, as the feed amount of hydrocarbons WM, a specific feed amount WMS is stored. The detected operating state of the internal combustion engine can be used as the basis to set the feed amount of hydrocarbons per feed.

Figure 30:
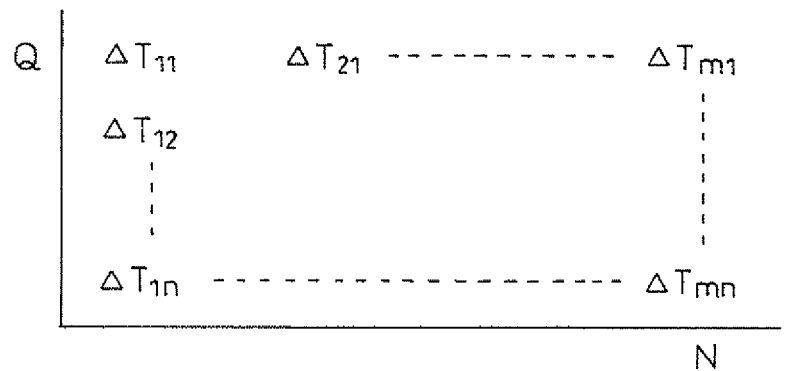
FIG. 30 is a map of a feed period of hydrocarbons as a function of the engine speed and the fuel injection amount in a combustion chamber.

FIG. 30 shows a map for setting the feed period of hydrocarbons in the temperature elevation control of the present embodiment. A map of the feed period $\Delta T$ of hydrocarbons is stored as a function of the engine speed N and the fuel injection amount Q in a combustion chamber in advance in the electronic control unit. By detecting the engine speed N and the fuel injection amount Q, the feed period $\Delta T$ of hydrocarbons can be set. In the operating example of the present embodiment, as the feed period $\Delta T$ of hydrocarbons, a specific feed period $\Delta TS$ is stored. The detected operating state of the internal combustion engine can be used as the basis to set the feed period of hydrocarbons. In this way, in the operating example of the present embodiment, the operating state of the internal combustion engine is used as the basis to set a specific feed period and a specific feed amount.

Referring to FIG. 28, next, at step 125, the set feed period of hydrocarbons and the set feed amount of hydrocarbons per feed are used as the basis to feed hydrocarbons from the hydrocarbon feed valve.

In this way, in the temperature elevation control of the present embodiment, a high $NO_x$ purification rate can be maintained while reducing the feed amount of hydrocarbons per feed. Furthermore, hydrocarbons can be fed in accordance with the operating state of the internal combustion engine.

In the above operating example, the example of selecting the specific feed period $\Delta TS$ among the values of the region WT of the end part at the short side of the feed period was explained, but it is possible to select any feed period of hydrocarbons and feed amount of hydrocarbons per feed in the range of the region WT of the end part at the short side of the feed period so as to feed hydrocarbons. For example, referring to FIG. 26, it is also possible to employ in the longest feed period $\Delta TL$ in the region WT of the end part at the short side of the feed period. By employing the feed period $\Delta TL$, it is possible to suppress a drop in the $NO_x$ purification rate even if the operating state of the internal combustion engine fluctuates such as the $NO_x$ purification rate instantaneously deteriorating.

Figure 31:
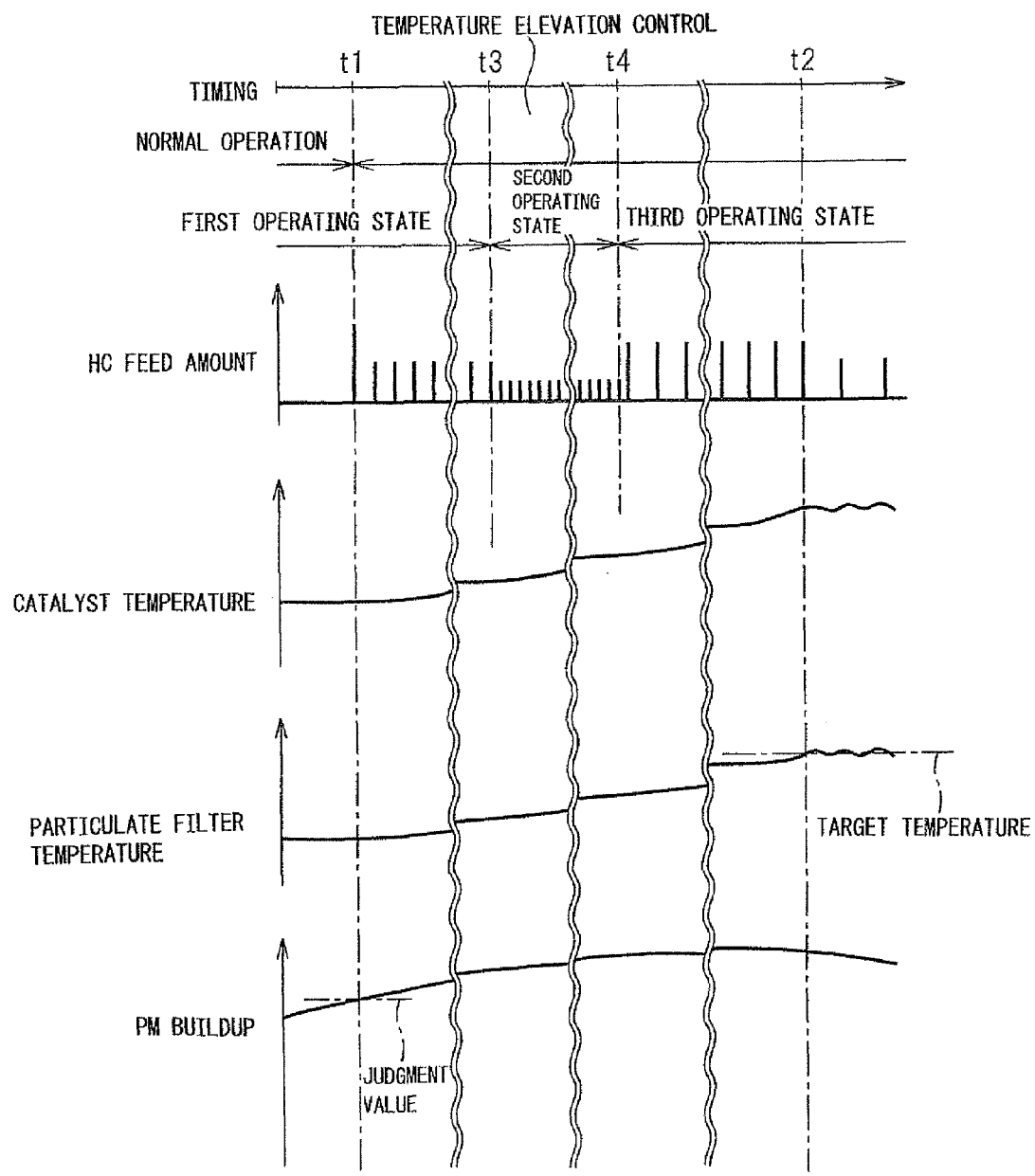
FIG. 31 is a time chart of an operating example of temperature elevation control in the embodiment.

FIG. 31 shows a time chart of an operating example of the exhaust purification system in the present embodiment. In the operating example which is shown in FIG. 31, temperature elevation control is performed in the period when the operating state of the internal combustion engine is fluctuating. For example, an operating example which performs temperature elevation control in the period when the requested load fluctuates is shown. Note that, regarding the hydrocarbon (HC) feed amount, the height of the graph corresponds to the feed amount of hydrocarbons per feed. The higher the graph, the greater the feed amount of hydrocarbons per feed.

Up until the time t1, the internal combustion engine is normally operated. In the present embodiment, the active $NO_x$ amount which is held at the exhaust purification catalyst and the holdable speed of the $NO_x$ are used as the basis to set the feed period of hydrocarbons and the feed amount of hydrocarbons.

At the time t1, the amount of buildup of particulate matter of the particulate filter reaches a predetermined judgment value. For this reason, from the time t1, temperature elevation control is started for regenerating the particulate filter. At the time t1, the feed interval of hydrocarbons and the feed amount of hydrocarbons per feed are set so as to feed hydrocarbons a plurality of times. In the present operating example, the temperature elevation control which is shown in FIG. 28 is performed every predetermined time interval.

In the present operating example, at the time t1 in which regeneration of the particulate filter is started, the operating state of the internal combustion engine is the first operating state. In this regard, at the time t3 during the period of temperature elevation control, the operating state of the internal combustion engine changes from the first operating state to the second operating state. The feed period of hydrocarbons and the feed amount of hydrocarbons per feed are newly calculated and set. For this reason, the feed period of hydrocarbons and the feed amount of hydrocarbons per feed change. Furthermore, at the time t4, the operating state of the internal combustion engine changes from the second operating state to the third operating state. For this reason, further, the feed period of hydrocarbons and the feed amount of hydrocarbons change. After this, at the time t2, the temperature of the particulate filter reaches the target temperature.

In the temperature elevation control of the operating example, the operating state of the internal combustion engine is detected every predetermined time interval and the detected operating state of the internal combustion engine is used as the basis to set the feed amount of hydrocarbons per feed and the feed period of hydrocarbons. The temperatures of the particulate filter detected at the individual timings and the target temperature are used as the basis to set the total feed amount of hydrocarbons. The total feed amount of hydrocarbons which is calculated at the temperature elevation control is equal to the remaining feed amount of hydrocarbons for raising the temperature of the particulate filter to the target temperature. For this reason, the higher the temperature of the particulate filter, the smaller the total feed amount of hydrocarbons.

Furthermore, the detected operating state of the internal combustion engine is used as the basis to set the feed period of hydrocarbons and the feed amount of hydrocarbons per feed and to change the feed period of hydrocarbons and the feed amount of hydrocarbons per feed. By feeding hydrocarbons in accordance with the change in the operating state of the internal combustion engine in this way, even if the operating state of the internal combustion engine changes, a high $NO_x$ purification rate can be maintained, the hydrocarbons can be kept from passing straight through the exhaust purification catalyst more reliably, and the temperature controllability of the exhaust purification catalyst can be improved more. The predetermined interval for repeating the setting of the feed interval and the feed amount is not limited to a time interval. For example, it is possible to employ any interval such as the number of times of feed of hydrocarbons.

In the operating example of the present embodiment, even after the temperature of the particulate filter reaches the target temperature at the time t2, similar temperature elevation control is continued. By continuing the temperature elevation control, it is possible to maintain the temperature of the particulate filter at the target temperature. For example, by repeating the temperature elevation control which is shown in FIG. 28 every predetermined interval even from the time t2 on, hydrocarbons are fed when the temperature of the particulate filter becomes less than the target temperature, so the temperature of the particulate filter can be maintained at the target temperature. Note that, sometimes the difference between the temperature of the particulate filter and the target temperature is small and the total feed amount of hydrocarbons becomes small. When the $NO_x$ purification rate cannot be maintained high since the total feed amount of hydrocarbons is small, control may be performed to wait to feed the hydrocarbons until the particulate filter falls to a predetermined temperature. Further, the control for maintaining the temperature after the temperature of the particulate filter reaches the target temperature is not limited to this. Any control may be employed.

By making the particulate filter a high temperature, the particulate matter which builds up on the particulate filter is oxidized and decreased. When the amount of buildup of particulate matter of the particulate filter becomes less than a predetermined judgment value, regeneration of the particulate filter can be ended. For example, it is possible to end the temperature elevation control in the present embodiment and shift to control of normal operation.

Figure 32:
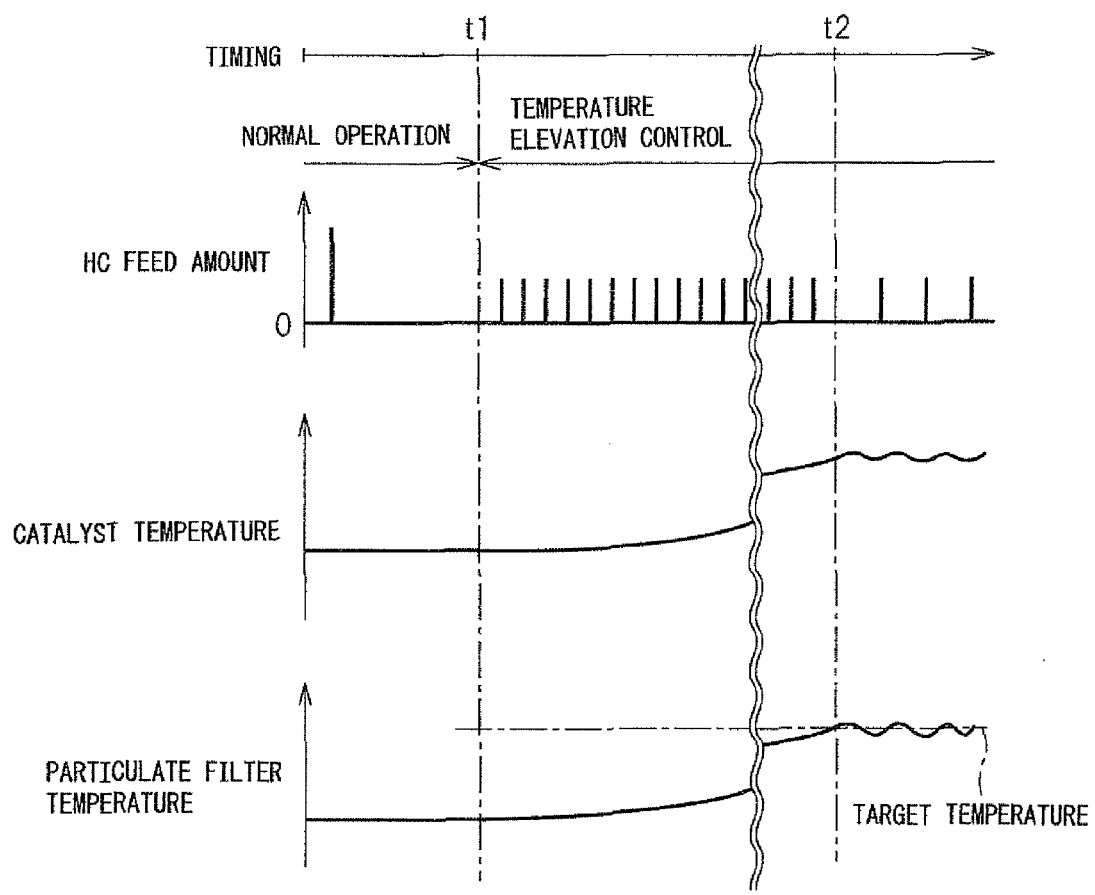
FIG. 32 is a time chart of another operating example of temperature elevation control in the embodiment.

FIG. 32 shows another operating example of the exhaust purification system in the present embodiment. The operating example which is shown in FIG. 32 can be applied to an internal combustion engine in which the requested load etc. are constant and the operating state is substantially constant. Alternatively, it can be applied to an internal combustion engine in which the operating state has a substantially constant time period. For example, even in an internal combustion engine where the requested load fluctuates, it can be employed for the time period of an operating state such as constant speed driving of a vehicle where the requested load is substantially constant.

Up to the time t1, normal operation is performed. At the time t1, the particulate filter is regenerated by starting temperature elevation control. At the time t1, the feed period of hydrocarbons and the feed amount of hydrocarbons per feed are set. The hydrocarbons continue to be fed a plurality of times by the set feed period of hydrocarbons and feed amount of hydrocarbons per feed until the temperature of the exhaust purification catalyst reaches the target temperature. At the time t2, the temperature of the particulate filter reaches the target temperature. In this way, when the operating state of the internal combustion engine is constant, it is also possible to set the feed period of hydrocarbons and the feed amount of hydrocarbons per feed when raising the temperature and continue the set feed patterns until the particulate filter reaches the target temperature.

Figure 33:
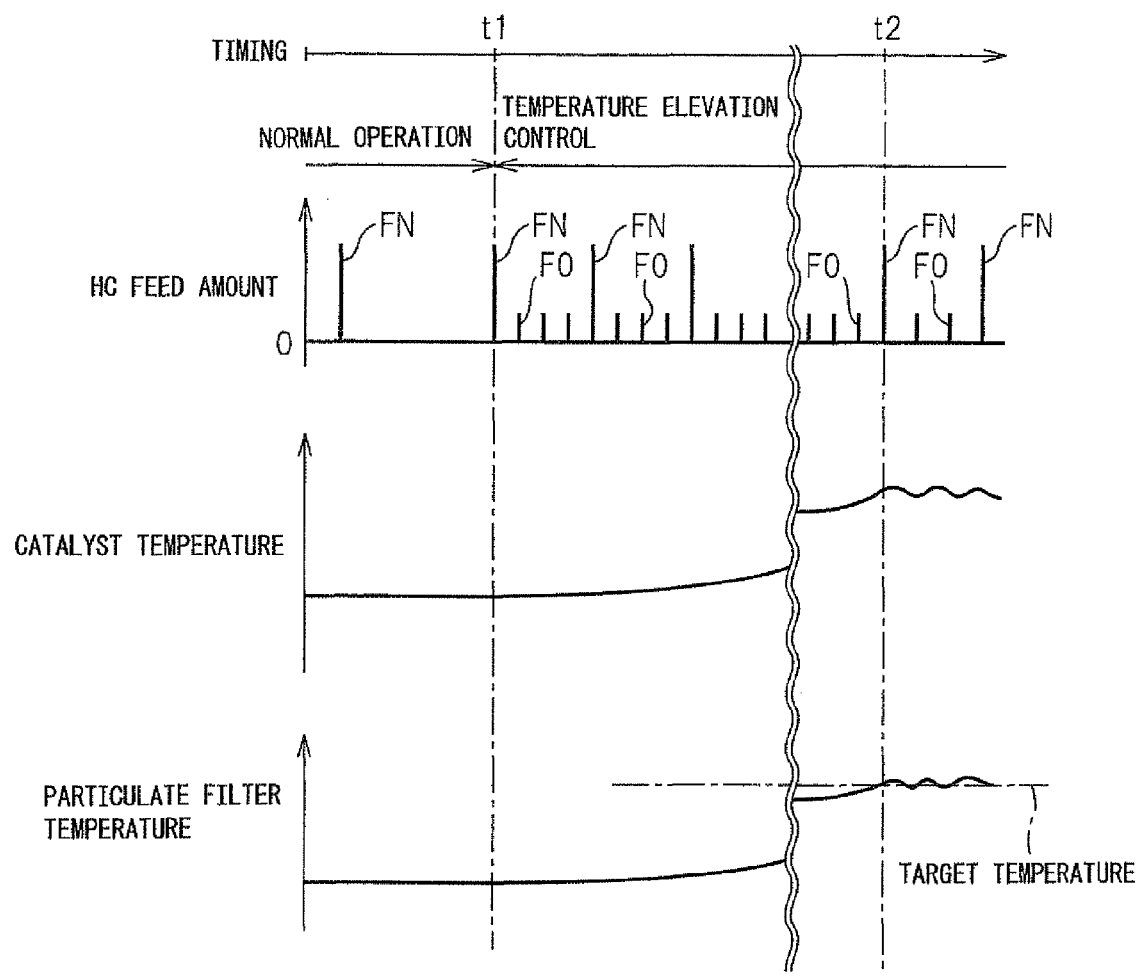
FIG. 33 is a time chart of still another operating example in the embodiment when raising the temperature of the particulate filter.

FIG. 33 explains still another operating example of the exhaust purification system in the present embodiment. In the above exhaust purification system, when performing regeneration, normal operational control is switched to temperature elevation control. In still another operating example of the present embodiment, while continuing normal operational control, additional hydrocarbons are fed. The feed period of additional hydrocarbons and the feed amount of additional hydrocarbons can be determined in advance.

At the time t1, the particulate filter starts to be regenerated. In addition to the feed FN of hydrocarbons at normal operation, a predetermined amount of hydrocarbons FO is fed. The feed FO of the additional hydrocarbons is performed every predetermined time interval. The feed FO of the additional hydrocarbons is performed between feeds FN of hydrocarbons at normal operation.

When feeding additional hydrocarbons as well, the feed amount of hydrocarbons per feed is preferably made small. For this reason, in feeding additional hydrocarbons, for example, it is possible to employ the smallest feed amount of the hydrocarbon feed valve. At the time t2, the temperature of the particulate filter reaches the target temperature. Further, in another operating example as well, the hydrocarbons can be kept from passing straight through the exhaust purification catalyst while raising the temperature of the exhaust purification catalyst.

In the normal operational control of the internal combustion engine in the present embodiment, the $NO_x$ amount which is held at the exhaust purification catalyst and the holdable speed of the $NO_x$ are estimated and the estimated $NO_x$ amount and holdable speed of $NO_x$ are used as the basis to set the feed period of hydrocarbons and the feed amount of hydrocarbons per feed, but the invention is not limited to this. Any control may be used for normal operation. For example, the amount of fuel injection in a combustion chamber and the engine speed may be used as the basis to set the feed period of hydrocarbons and the feed amount of hydrocarbons per feed.

In the present embodiment, the explanation was given with reference to the example of a particulate filter as the post treatment device which is arranged downstream of the exhaust purification catalyst, but the post treatment device is not limited to this. It is possible to employ any treatment device which has to be raised in temperature in a predetermined state.

In the present embodiment, a hydrocarbon feed valve is arranged in the engine exhaust passage and hydrocarbons are fed from the hydrocarbon feed valve so as to feed hydrocarbons to the exhaust purification catalyst, but the invention is not limited to this. Any device or control may be used to feed hydrocarbons to the exhaust purification catalyst.

Note that, the above embodiments may be suitably combined. Further, the steps in the above operational control may be suitably switched in order so long as their actions and functions can be maintained.

In the above figures, the same or equivalent parts are assigned the same reference signs. Note that, the above embodiments are illustrations and do not limit the invention. Further, the embodiments include changes which are shown in the claims.

REFERENCE SIGNS LIST 2 combustion chamber
3 fuel injector
8 intake air detector
13 exhaust purification catalyst
14 particulate filter
15 hydrocarbon feed valve
50 catalyst carrier
51, 52 catalyst particles
53 basic layer
54 flow surface part

The invention claimed is:

1. An exhaust purification system of an internal combustion engine in which, inside an engine exhaust passage, an exhaust purification catalyst for causing a reaction between $NO_x$ which is contained in exhaust gas and modified hydrocarbons is arranged, precious metal catalysts are carried on an exhaust gas flow surface of the exhaust purification catalyst, and a basic exhaust gas flow surface part is formed around the precious metal catalysts, wherein the exhaust purification catalyst has a property of reducing $NO_x$ which is contained in exhaust gas if making a concentration of hydrocarbons which flow into the exhaust purification catalyst vibrate by within a predetermined range of amplitude and within a predetermined range of period and has a property of a storage amount of $NO_x$ which is contained in the exhaust gas increasing if making a vibration period of the concentration of hydrocarbons longer than a predetermined range, the system is provided with a post treatment device which is arranged in the engine exhaust passage downstream from the exhaust purification catalyst and which is raised in temperature when reaching a predetermined state and is formed to use heat of oxidation of hydrocarbons which is generated in the exhaust purification catalyst to raise temperature of the exhaust gas and raise the temperature of the post treatment device as temperature elevation control, in a control for making the concentration of hydrocarbons which flow into the exhaust purification catalyst vibrate by within the predetermined range of amplitude and within the predetermined range of period, when feeding a predetermined total feed amount of hydrocarbons during a predetermined period, the exhaust purification catalyst has an ascending range where a $NO_x$ purification rate rises if making a feed period of hydrocarbons change to become longer and a high purification rate range where the $NO_x$ purification rate becomes higher than a predetermined rate, and, in the temperature elevation control, the total feed amount of hydrocarbons required for raising the temperature of the post treatment device is set, the feed period of hydrocarbons and a feed amount of hydrocarbons per feed are set in the high purification rate range in a region at an end at short side of feed period of hydrocarbons, and hydrocarbons are fed by a set feed period of hydrocarbons and feed amount of hydrocarbons per feed.

2. An exhaust purification system of an internal combustion engine as set forth in claim 1, wherein in the temperature elevation control, the system feeds the hydrocarbons by a specific feed period with the shortest feed period of hydrocarbons in the high purification rate range and by a specific feed amount of the feed amount of hydrocarbons per feed which corresponds to that specific feed period.

3. An exhaust purification system of an internal combustion engine as set forth in claim 1, wherein in the temperature elevation control, the system detects a operating state of the internal combustion engine every predetermined interval and uses a detected operating state of the internal combustion engine as the basis to set the feed period of hydrocarbons and the feed amount of hydrocarbons per feed and change the feed period of hydrocarbons and the feed amount of hydrocarbons per feed.

4. An exhaust purification system of an internal combustion engine as set forth in claim 1, wherein the post treatment device includes a particulate filter, and
the temperature elevation control includes control for raising the temperature so as to make particulate matter which is deposited on the particulate filter oxidize.

5. An exhaust purification system of an internal combustion engine as set forth in claim 1, wherein inside the exhaust purification catalyst, the $NO_x$ which is contained in the exhaust gas and the modified hydrocarbons react whereby a reducing intermediate which contains nitrogen and hydrocarbons is produced, and
the vibration period of the concentration of hydrocarbons is a period required for continued production of the reducing intermediate.

6. An exhaust purification system of an internal combustion engine as set forth in claim 1, wherein the precious metal catalyst is comprised of at least one of rhodium Rh and palladium Pd and of platinum Pt.

7. An exhaust purification system of an internal combustion engine as set forth in claim 1, wherein the exhaust purification catalyst includes a basic layer which is formed on the exhaust gas flow surface and which contains an alkali metal or alkali earth metal or rare earth or metal which can donate electrons to the $NO_x$, and a surface of the basic layer forms the basic exhaust gas flow surface part.

* * * * *